United States Patent
Davies

(10) Patent No.: US 6,615,135 B2
(45) Date of Patent: Sep. 2, 2003

(54) SATELLITE BASED ON-BOARD VEHICLE NAVIGATION SYSTEM INCLUDING PREDICTIVE FILTERING AND MAP-MATCHING TO REDUCE ERRORS IN A VEHICULAR POSITION

(75) Inventor: F. Bryan Davies, Vienna, VA (US)

(73) Assignee: PRC Inc., McLean, VA (US)

( * ) Notice: Subject to any disclaimer, the term of this patent is extended or adjusted under 35 U.S.C. 154(b) by 0 days.

(21) Appl. No.: 09/863,883

(22) Filed: May 24, 2001

(65) Prior Publication Data
US 2002/0177950 A1 Nov. 28, 2002

(51) Int. Cl.[7] .............................. G01S 5/02; H04B 7/185
(52) U.S. Cl. ................... 701/213; 701/215; 342/357.01
(58) Field of Search ................................ 701/213, 215, 701/207, 201, 205, 210, 224, 209, 214, 200; 342/357.13, 357.01, 357.03, 357.02, 357.07; 340/988, 990, 995

(56) References Cited

U.S. PATENT DOCUMENTS

| | | | |
|---|---|---|---|
| 5,087,919 A | | 2/1992 | Odagawa et al. ....... 342/357.13 |
| 5,225,842 A | * | 7/1993 | Brown et al. ................ 342/357 |
| 5,276,451 A | * | 1/1994 | Odagawa .................... 342/357 |
| 5,345,388 A | | 9/1994 | Kashiwazaki ............... 701/213 |
| 5,394,333 A | | 2/1995 | Kao ........................... 701/217 |
| 5,416,712 A | | 5/1995 | Geier et al. ................. 701/216 |
| 5,451,964 A | | 9/1995 | Babu ...................... 342/357.06 |
| 5,452,211 A | * | 9/1995 | Kyrtsos et al. .............. 364/449 |
| 5,742,923 A | * | 4/1998 | Odagawa .................... 701/207 |
| 5,774,824 A | * | 6/1998 | Streit et al. ................. 701/207 |
| 5,774,829 A | * | 6/1998 | Cisneros et al. ............ 701/213 |
| 6,064,942 A | * | 5/2000 | Johnson et al. ............. 701/213 |
| 6,144,338 A | * | 11/2000 | Davies ................. 342/357.13 |
| 6,317,683 B1 | * | 11/2001 | Ciprian et al. ............. 701/118 |

OTHER PUBLICATIONS

Artech House, Inc., Understanding GPS Principles and Applications, 1996 Artech House, Inc., Elliott D. Kaplan, Editor, 1996, pp. 385–437.

* cited by examiner

Primary Examiner—Tan Q. Nguyen
Assistant Examiner—Dalena Tran
(74) Attorney, Agent, or Firm—Lowe Hauptman Gilman & Berner, LLP

(57) ABSTRACT

An accurate position of a mobile receiver is determined using a received positional signal having relatively low and high frequency noise components corrupting the positional accuracy of the positional signal. A low frequency error associated with a detected turn of the mobile receiver is derived and applied as a low frequency correction factor to positions of the receiver derived after the turn is detected. Resulting corrected positions are applied along with associated high frequency correction factors representative of the high frequency noise component to a predictive filter to derive predicted positions substantially free of the low and high frequency noise components.

34 Claims, 13 Drawing Sheets

306

| MAP REGION | NAME | FEATURE IDENTIFIER | ORDERED USE OF COORDINATES |
|---|---|---|---|
| L1  R1 | A' | Street | |
| L2  R1 | B' | Street | |
| L3  R1 | C' | Street | |
| L4  R1 | D' | Street | |
| L5  R1 | P | Intersection | |
| L6  R1 | Q | Intersection | |

SATELLITE BASED ON-BOARD VEHICLE NAVIGATION SYSTEM INCLUDING PREDICTIVE FILTERING AND MAP-MATCHING TO REDUCE ERRORS IN A VEHICULAR POSITION

FIELD OF THE INVENTION

The present invention relates generally to on-board, vehicle navigation systems, and more particularly, to such a system usable with a positioning system, such as a global positioning system (GPS), for accurately determining the position of a mobile receiver, such as a GPS receiver, by reducing relatively low and high frequency noise components corrupting the signals received from the GPS satellites using predictive and map-matching algorithms.

BACKGROUND OF THE INVENTION

On-board vehicle navigation systems often rely on the Global positioning System (GPS) for sensing an absolute or actual position of a vehicle hosting the on-board system. Such on-board navigation systems include a mobile GPS receiver installed in the vehicle, and typically integrated with a host of other sensors, such as an odometer and/or gyroscope. The mobile GPS receiver senses a vehicle position, referred to as a GPS position, based on signals received at the GPS receiver from a plurality of GPS satellites, as is known.

However, the accuracy of the GPS position suffers because of problems associated with multipath reflections of the GPS satellite signals, and from artificial accuracy degradation caused by Selective Availability (SA) resulting from military control of the GPS satellites. For example, SA can induce a positional error on the order of one-hundred meters, with a root-mean-square (RMS) error of approximately forty meters. In addition to the multipath and SA, clock jitter and transient loss-of-signal conditions further degrade GPS position accuracy.

U.S. Pat. No. 5,087,919 discloses one application of an on-board navigation system, wherein GPS positions from a GPS receiver are matched to street locations stored in a map database of the on-board system. The on-board system displays the map matched GPS positions along with map based topological information, such as a city street network. The system uses a two step process to match a GPS position with a street represented in the map database. First, the process identifies candidate streets represented in the map database within a predetermined distance of the GPS position. Second, beginning with the nearest candidate street, the process steps individually through the candidate streets to identify a candidate street having a heading or direction "substantially matching" a heading or travelling direction of the vehicle, determined based on the GPS positions.

Requiring a "substantial match" between the street and vehicle headings tends to be too strict or limiting a map matching criterion because it does not take into account error in the vehicle heading caused by the error or noise sources previously mentioned. Consequently, the map matching process unnecessarily eliminates a valid street (where the vehicle is actually located), and most likely all streets, from consideration when the vehicle heading and the valid street heading fail to meet the substantially matching criterion because of such error. On the other hand, if the criterion is substantially relaxed or significantly expanded to accommodate such error, the map matching process tends to erroneously select invalid streets where the vehicle is not located because the criterion is insufficiently selective.

Accordingly, in a map matching algorithm for matching a position of a receiver derived from a satellite signal with a probable position on a street represented in a map database, there is a need to reduce the probability that a valid street is eliminated from consideration because of a corrupted vehicle heading, and that an invalid street is erroneously selected.

Emergency vehicle applications of the on-board navigation system require a rapid, accurate response from the on-board navigation system. Emergency vehicle applications include navigation or fleet management of emergency vehicles, such as police and fire fighting vehicles, carrying the on-board navigation system. In such applications, it is highly desirable to associate the position of the emergency vehicle with a street on a city street network, within approximately five seconds after activating the GPS receiver in the on-board navigation system. The position indicated by the on-board system after five seconds, and typically displayed as mentioned above, must accurately associate the emergency vehicle with the correct street on which the vehicle is travelling, so as to reduce navigational errors and thus decrease emergency vehicle response time.

Accordingly, in an on-board navigation system including a GPS receiver, a need exists for rapidly and accurately associating a position derived by the GPS receiver with a position on a map, such as street position, within five seconds or less after activating the receiver.

On-board vehicle navigation systems commonly include a predictive filter, such as a Kalman Filter (KF), to improve the accuracy of the degraded GPS positions, and to integrate the GPS positions with information from the other sensors. As is known, the KF predictively filters a measured variable over time to derive expected or predicted values of the variable. For example, Kalman filters typically filter a series of GPS positions to derive a series of predicted positions of the GPS receiver. In deriving such predictions, the KF applies a weighing function, known as the Kalman gain, which is optimized by the Kalman filtering process to produce a minimum error variance. An important aspect of the KF includes adaptive adjustment of the Kalman gain responsive to continuous feedback of the error variance.

Importantly, the KF provides an accurate prediction only when the measured variable supplied to the KF is corrupted by uncorrelated or white noise. This means the noise corrupting consecutive measurements, such as consecutive GPS positions, must be uncorrelated for the KF to work effectively. Otherwise, correlated noise, inducing correlated error in the GPS positions, tends to throw the Kalman gain, and thus the predictions, off-track. Stated otherwise, if the noise corrupting the GPS positions has a time constant substantially greater than the time between consecutive GPS position measurements, then such low frequency noise tends to render the KF ineffective. As a result, the KF is ineffective at removing the relatively low frequency or slowly varying noise component from the GPS positions. On the other hand, in the absence of such low frequency noise, if the noise corrupting the GPS positions has a time constant on the order of, or less than, the time between consecutive GPS position measurements, then the KF arrives at accurate predictions. As a result, the KF can filter such a relatively high frequency or fast varying noise component from the GPS positions.

Because the KF responds favorably and unfavorably to high (uncorrelated) and low (correlated) frequency noise, respectively, it is instructive to broadly categorize the noise/ errors due to Selective Availability, multipath, clock jitter, and transient-loss-of-signal as having high and/or low frequency noise components. Selective Availability has been empirically determined to vary slowly over hundreds of seconds, and is thus considered a low frequency error bias corrupting GPS positions, and consequently, KF predictions. This is especially true for modern GPS receivers that provide frequent GPS position updates, for example, once every second. The effects of multipath can vary drastically from second to second as the mobile GPS receiver travels quickly past, for example, buildings, trees, and bridges. On the other hand, multipath effects can vary slowly as the mobile receiver travels past, for example, large bodies of water. Multipath errors thus exhibit both low and high frequency noise components. Transient-loss-of-signal is considered to exhibit both low and high frequency noise components, while clock jitter is characteristically, only short term in nature.

U.S. Pat. No. 5,416,712 discloses a system for reducing correlated error corrupting GPS positions. The system includes a modified KF in combination with external sensors, such as an odometer and a gyroscope, to reduce errors. The modified KF includes error variance and Kalman gain equations which approximately model the correlated error. Simply stated, the modified equations increase the gain floor of the KF to account for correlated error, to enable the modified KF to filter correlated, as well as uncorrelated, error.

This approach to reducing correlated error had several disadvantages. First, it requires a relatively complex modification to an otherwise standard or commercial-off-the-shelf KF, thus adding substantial complexity and cost to the on-board navigation system. Second, the modified KF only approximates correlated error due to SA, and thus provides an approximate solution limited in scope. Third, the modified KF tends to ignore correlated error from sources other than SA, such as multipath, because the correlated error model used by the modified KF is tuned to SA. Another disadvantage of the system is the requirement for external sensors in addition to the GPS receiver, further increasing complexity and cost of the on-board navigation system.

Another known approach to reducing correlated error in GPS positions is to use differential GPS receiver technology. Differential GPS technology disadvantageously requires a GPS reference base station in addition to the mobile GPS receiver, thus increasing cost and complexity of the overall navigation system.

Accordingly, a need exists for accurately determining the position of a mobile receiver by reducing low and high frequency noise components corrupting signals received from a positioning system, such as the GPS satellite system. A related need exists for removing such noise from predicted positions derived by predictively filtering the signals received from the positioning system, without using external sensors or differential GPS technology.

SUMMARY OF THE INVENTION

It is, therefore, an object of the present invention to substantially overcome the above-identified problems and substantially fulfill the above-identified needs.

It is another object of the present invention to accurately determine the position of a mobile receiver in an on-board, vehicle navigation system by reducing relatively low and high frequency noise components corrupting position signals from a positioning system, such as the GPS satellite system.

Another object is to remove relatively low and high frequency noise components from predicted positions derived by predictively filtering position signals from a positioning system, without using external sensors or differential GPS technology.

It is another object of the present invention to rapidly and accurately associate position signals from a positioning system with a position on a street represented in a map database within five seconds or less.

Another object is to map match a position of a receiver derived from a satellite signal with a probable position on a street represented in a map database using a heading of the receiver derived from the satellite signal, and to reduce the probability that a valid street is eliminated from consideration because of error in the heading of the receiver, and that an invalid street is erroneously selected.

In accordance with the present invention, an accurate position of a mobile receiver is determined using a received positional signal having relatively low and high frequency noise components corrupting the positional accuracy of the positional signal. Positions of the mobile receiver are derived using the received positional signal. The positions are predictively filtered by a predictive filter to derive predicted positions of the mobile receiver. The predicted positions are corrupted by the low and high frequency noise components. A turn of the mobile receiver is detected and a first positional error associated with the turn is derived. The first positional error represents a distance between 1) a predicted turn position derived using the predicted positions and 2) a probable turn position of where the mobile receiver probably turned on a navigable route represented in a map database and selected from the map database using a map matching algorithm.

The first positional error is used as a low frequency feedback correction factor to correct positions of the mobile receiver derived using the received signal and after the turn is detected. Such low frequency correction advantageously removes the low frequency noise component from the positions before the positions are applied to the predictive filter.

Each of the positions derived after the turn is detected is corrected using the low frequency correction factor to derive corrected positions. Each of the corrected positions is applied to the predictive filter along with a second positional error associated with each of the corrected positions and representative of the high frequency noise component, to advantageously derive filtered, predicted positions substantially free of the low and high frequency noise components. Each second positional error represents a distance between the associated corrected position and a navigable route on which the mobile receiver is probably located, and is advantageously used as a high frequency feedback correction, and more specifically, as a variance error to advantageously control the gain of the predictive filter.

In accordance with another aspect of the present invention, a map matching algorithm is used to match a predicted position of a mobile receiver with a probable position of the mobile receiver coinciding with a known navigable route of where the mobile receiver is probably located. The algorithm includes identifying candidate navigable routes in a map database within a predetermined distance of the predicted position. A weighted distance between each of the navigable routes and the predicted position is derived using a shortest distance and a difference in direction between each candidate navigable route and the mobile receiver. The weighted distance is derived using a modified cosine weighting function that adds distance to the shortest distance depending on the difference in direction between the candidate route and the mobile receiver. The probable position coincides with the navigable route associated with the minimum weighted distance.

In accordance with another aspect of the present invention, a method of rapidly associating a position of a mobile receiver with a navigable route accessible in a map database is disclosed. The method includes seeding a predictive filter with an initial value indicative of an erroneous current position value of the mobile receiver displaced a predetermined minimum distance from a known approximate position of the mobile receiver to establish an initial gain of the predictive filter. A positional signal is received over m time periods and position values of the mobile receiver are derived over the m time periods using the received positional signal. Predicted position values of the mobile receiver are derived over the m time periods by predictively filtering the position values with the predictive filter. A probable position of the mobile receiver is determined at an end of the m time periods using a current predicted position value. The probable position coincides with a navigable route on which the mobile receiver is probably positioned at the end of the m time periods. The probable position is derived using the map matching algorithm described above.

In accordance with another aspect of the present invention, a method of accurately determining the position of a mobile receiver is disclosed. The method includes detecting a turn of the mobile receiver using a received positional signal and deriving a first positional offset associated with the turn and representative of a low frequency noise component corrupting the positional accuracy of the received signal. A position value of the mobile receiver is derived using the received positional signal after detecting the turn, and the position value is corrected with the first positional offset associated with the turn to derive a corrected position value. The corrected position value is applied to a filter along with a second positional offset associated with the corrected position value and representative of a high frequency noise component corrupting the positional accuracy of the received signal to derive a filtered position value substantially free of the low and high frequency noise components.

In accordance with another aspect of the present invention, a method of accurately determining the position of a mobile receiver includes receiving a positional signal over time intervals $T_1$ through $T_m$, where T represents the duration of each time interval and the subscript represents the position of each time interval in the sequence of time intervals $T_1$ through $T_m$. Position values of the mobile receiver at time intervals $T_1$ through $T_m$ are derived using the received positional signal. The position values at time intervals $T_1$ through $T_{m-1}$ are filtered with a predictive filter to derive predicted position values of the mobile receiver at time intervals $T_1$ through $T_{m-1}$. A first positional error indicative of a low frequency noise component reducing the accuracy of the position values and predicted position values at time intervals $T_1$ through $T_m$ is derived using predicted position values $T_1$ through $T_{m-1}$. The position value at time interval $T_m$ is corrected with the first positional error to derive a corrected position value at time interval $T_m$. The corrected position value at time interval $T_m$ is predictively filtered to derive a predicted position of the mobile receiver at time interval $T_m$, the predicted position at time interval $T_m$ being substantially free of the low frequency noise component.

In accordance with another aspect of the present invention, a method of accurately determining the position of a mobile receiver includes receiving a positional signal and deriving position values of the mobile receiver using the positional signal. The position values are applied to a predictive filter to derive predicted position values of the mobile receiver. A turn of the mobile receiver is detected using the predicted position values and a first positional offset associated with the turn is derived. The first positional offset represents a low frequency noise component corrupting the positional accuracy of the received signal. Position values derived after the turn is detected are corrected using the first positional offset to derive corrected position values. A second positional offset is derived between each of the corrected position values and a navigable route coinciding with where the mobile receiver is probably located for each of the corrected position values. The second positional offset represents a high frequency noise corrupting the positional accuracy of the received signal. Each of the corrected position values is applied along with the second positional offset associated with each of the corrected position values to the predictive filter to derive predicted position values substantially free of the low frequency and high frequency noise.

In yet another aspect of the present invention, an article is disclosed including at least one sequence of machine executable instructions. A medium bears the executable instructions in machine readable form, wherein execution of the instructions by one or more processors causes the one or more processors to seed a predictive filter with an initial value indicative of an erroneous current position value of the MR displaced a predetermined minimum distance from a known approximate position of the MR to establish an initial gain of the predictive filter. The one or more processors receives a positional signal over m time periods and derives position values of the MR over the m time periods using the received signal. The one or more processors derives predicted position values of the MR over the m time periods by predictively filtering the position values with the predictive filter, and determines a probable position of the MR at an end of the m time periods using a current predicted position value, the probable position coinciding with a navigable route of where the MR is probably positioned at the end of the m time periods.

In a further aspect of the present invention, an article is disclosed including at least one sequence of machine executable instructions and a medium bearing the executable instructions in machine readable form, wherein execution of the instructions by one or more processors causes the one or more processors to detect a turn of the MR using a received positional signal having a positional accuracy corrupted by relatively low and high frequency noise components, and derive a first positional offset associated with the turn and representative of the low frequency noise component. The one or more processors derive a position value of the MR using the received positional signal after detecting the turn, and correct the position value with the first positional offset associated with the turn to derive a corrected position value. The one or more processors apply the corrected position value to a filter along with a second positional offset associated with the corrected position value and representative of the high frequency noise component to derive a filtered position value substantially free of the low and high frequency noise components.

In an even further aspect of the present invention, a computer architecture is disclosed including seeding means for seeding a predictive filter with an initial value indicative of an erroneous current position value of the MR displaced a predetermined minimum distance from a known approximate position of the MR to establish an initial gain of the predictive filter. Receiving means are provided for receiving a positional signal over m time periods and for deriving position values of the MR over the m time periods using the received signal. Deriving means are provided for deriving predicted position values of the MR over the m time periods by predictively filtering the position values with the predictive filter. Determining means are provided for determining a probable position of the MR at an end of the m time periods using a current predicted position value, the probable position coinciding with a navigable route of where the MR is probably positioned at the end of the m time periods.

In another aspect of the present invention, a computer architecture is disclosed including detecting means for detecting a turn of the MR using a received positional signal having a positional accuracy corrupted by relatively low and high frequency noise components, and for deriving a first positional offset associated with the turn and representative of the low frequency noise component. Deriving means are provided for deriving a position value of the MR using the received positional signal after detecting the turn, and correcting means are provided for correcting the position value with the first positional offset associated with the turn to derive a corrected position value. Applying means are provided for applying the corrected position value to a filter along with a second positional offset associated with the corrected position value and representative of the high frequency noise component to derive a filtered position value substantially free of the low and high frequency noise components.

In yet another aspect of the present invention, a computer system is disclosed including a processor and a memory coupled to the processor, the memory having stored therein sequences of instructions, which, when executed by the processor, cause the processor to perform the step of seeding a predictive filter with an initial value indicative of an erroneous current position value of the MR displaced a predetermined minimum distance from a known approximate position of the MR to establish an initial gain of the predictive filter. The processor receives a positional signal over m time periods and derives position values of the MR over the m time periods using the received signal. The processor derives predicted position values of the MR over the m time periods by predictively filtering the position values with the predictive filter, and determines a probable position of the MR at an end of the m time periods using a current predicted position value, the probable position coinciding with a navigable route of where the MR is probably positioned at the end of the m time periods.

In another aspect of the present invention, a computer system is disclosed including a processor and a memory coupled to the processor, the memory having stored therein sequences of instructions, which, when executed by the processor, cause the processor to perform the steps of detecting a turn of the MR using a received positional signal having a positional accuracy corrupted by relatively low and high frequency noise components, and deriving a first positional offset associated with the turn and representative of the low frequency noise component. The processor derives a position value of the MR using the received positional signal after the turn is detected, and corrects the position value with the first positional offset associated with the turn to derive a corrected position value. The processor applies the corrected position value to a filter along with a second positional offset associated with the corrected position value and representative of the high frequency noise component to derive a filtered position value substantially free of the low and high frequency noise components.

Still other objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout wherein.

BEST MODE FOR CARRYING OUT THE INVENTION

Alternative processes of the present invention are described for accurately determining the location of a mobile receiver (MR), such as a GPS receiver, using predictive filtering of signals received from a positioning system, such as commercial GPS satellites, and a map matching algorithm. Although the present invention is described below in terms using GPS satellite signals received by GPS receivers, it should be understood that the present invention is equally applicable for use with any positional signal, which may be inaccurate, or of low precision. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Figure 1:
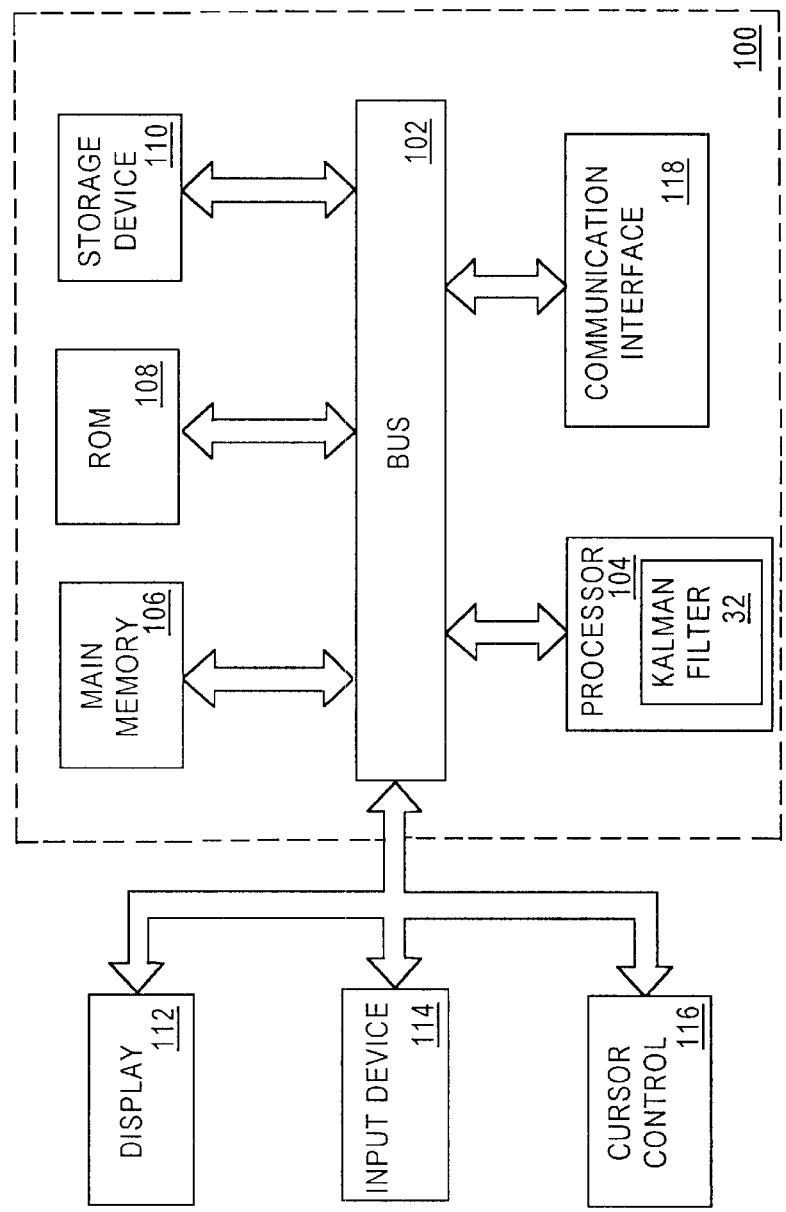
FIG. 1 is a high-level block diagram of an exemplary computer system with which the present invention can be implemented.

FIG. 1 is a block diagram illustrating an exemplary computer system 100 upon which an embodiment of the invention may be implemented. The present invention is usable with currently available personal computers, mini-mainframes and the like. The present invention is envisioned as usable in moving land vehicles travelling along known navigable routes. It is believed that the invention described herein can readily be adapted for specific hardware configurations for each of these operating environments.

Computer system 100 includes a bus 102 or other communication mechanism for communicating information, and a processor 104 coupled with the bus 102 for processing information. Computer system 100 also includes a main memory 106, such as a random access memory (RAM) or other dynamic storage device, coupled to the bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to the bus 102 for storing static information and instructions for the processor 104. A storage device 110, such as a magnetic disk or optical disk, is provided and coupled to the bus 102 for storing information and instructions.

Computer system 100 may be coupled via the bus 102 to a display 112, such as a cathode ray tube (CRT) or a flat panel display, for displaying information to a computer user. An input device 114, including alphanumeric and other keys, is coupled to the bus 102 for communicating information and command selections to the processor 104. Another type of user input device is cursor control 116, such as a mouse, a trackball, or cursor direction keys for communicating direction information and command selections to processor 104 and for controlling cursor movement on the display 112. This input device typically has two degrees of freedom in two axes, a first axis (e.g., x) and a second axis (e.g., y) allowing the device to specify positions in a plane.

The invention is related to the use of a computer system 100, such as the illustrated system, to accurately and rapidly determine the location or position of a GPS receiver. According to one embodiment of the invention, rapid and accurate position determination is provided by computer system 100 in response to processor 104 executing sequences of instructions contained in main memory 106. Such instructions may be read into main memory 106 from another computer-readable medium, such as storage device 110. However, the computer-readable medium is not limited to devices such as storage device 110. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 106 causes the processor 104 to perform the process steps described below. In alternative embodiments, hard-wired circuitry may be used in place of or in combination with software instructions to implement the invention. Thus, embodiments of the invention are not limited to any specific combination of hardware circuitry and software.

Computer system 100 also includes a communication interface 118 coupled to the bus 102. Communication interface 108 provides a two-way data communication as is known. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals which carry digital data streams representing various types of information.

Figure 2:
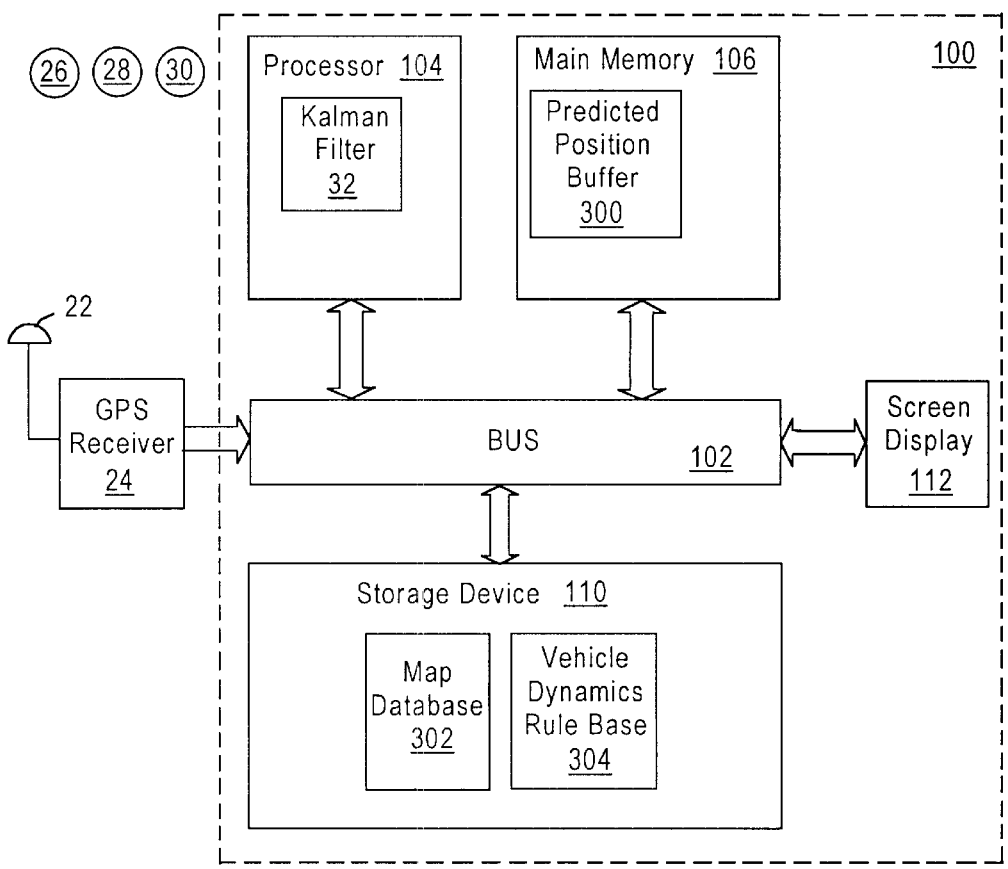
FIG. 2 is a schematic block diagram illustrating a GPS system embodiment of the present invention which rides on-board a moving vehicle and receives GPS satellite broadcasts.

Refer now to FIG. 2 where a mobile positioning system 100 having a GPS receiver 24 is depicted according to the present invention. As described in detail below, a GPS receiver 24 and a Kalman filter 32 (see also FIG. 1) cooperatively provide the structure for deriving the position of a mobile GPS receiver and for updating the location of the mobile GPS receiver in real time as the mobile GPS receiver changes positions. The Kalman filter 32 is a conventional filter and may be implemented in hardware such as circuitry, or in computer firmware form, or as software. Although shown separately, if implemented in software, the processor 104 would execute code from memory 106 to perform the Kalman filter function. Also, Kalman filter 32 need not be incorporated in processor 104, and can therefor be a separate device. As is known, Kalman filters are frequently used in stochastic systems in which measured variables are corrupted by operational and measurement noise. The Kalman filter filters out the stochastic component of the measured variables and outputs the expected value of those variables.

In FIG. 2, there is depicted a high level block diagram of the system of the present invention wherein a signal from one satellite or signals from one or more satellites 26, 28, 30 is received. The satellite signal is an encoded time signal and can be converted, in a manner well known in the art, to determine the position of the receiver on the earth's surface. Each of these satellites is a commercial satellite and so the signal is encoded and noise is intentionally added to the signal to prevent the use of the signal by terrorists. One such form of noise encoding or addition is known as Selective Availability, mentioned previously. As is appreciated, signals from commercial GPS satellites thus provide an approximation of the location of the received signal.

System 100 includes a conventional GPS antenna 22 and a GPS receiver 24. The GPS antenna 22 receives a plurality of signals from the GPS broadcast satellites 26, 28, 30 in a known manner. The received signals representative of the satellite data are input from the antenna 22 to the GPS receiver 24. The receiver 24 includes circuitry for computing a current GPS position of the mobile GPS receiver based upon the plurality of received GPS satellite signals. The GPS position is only an estimate of the current position because of the previously described errors and noise added either purposefully or inadvertently to the GPS signals. The GPS position is then input to the computer system 100. The Kalman filter 32 includes equations for predictively filtering GPS positions. As depicted in FIG. 2, Kalman filter 32 is in the form of firmware within the processor 104. The GPS receiver 24 is coupled to the bus 102 of computer system 100. The screen display 112 is coupled to the bus 102.

Figure 3A:
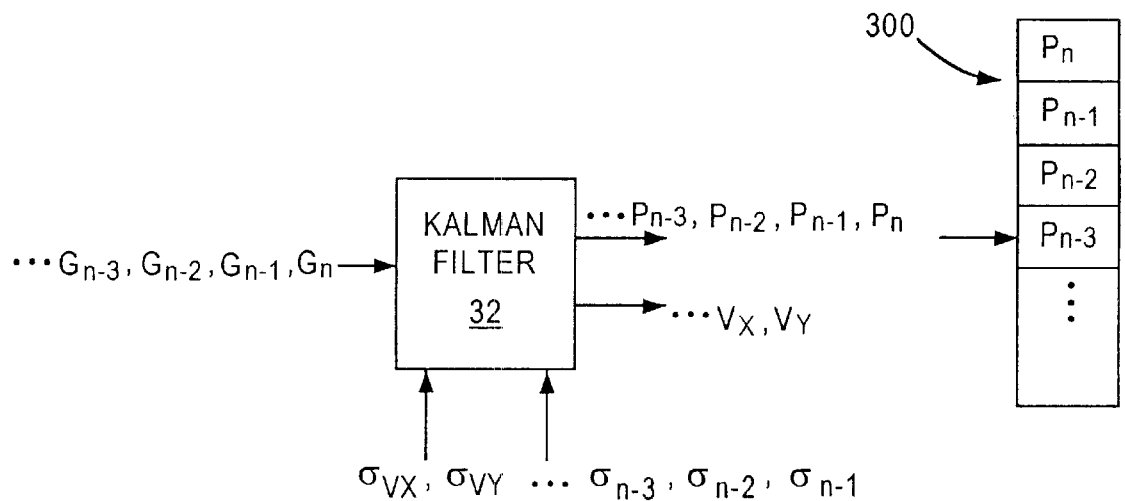
FIG. 3A is an illustration of the signal interfaces of a Kalman Filter used in the present invention, and entries in a storage buffer associated with the Kalman filter.

The system of the present invention uniquely incorporates conventional KF 32 in achieving the goals set forth above, as will become apparent from the following description. With reference to FIGS. 2 and 3A, receiver 24 derives a train of periodic GPS positions . . . $G_{n-3}$, $G_{n-2}$, $G_{n-1}$, $G_n$ in response to continuous receipt of the GPS satellite signal over a corresponding series of time intervals . . . $t_{n-3}$, $t_{n-2}$, $t_{n-1}$, $t_n$, where $t_n$ is the most recent or current time interval. KF 32 derives a corresponding series of predicted position . . . $P_{n-3}$, $P_{n-2}$, $P_{n-1}$, $P_n$ of the MR by predictively filtering the GPS positions. For example, current predicted position $P_n$ is derived by predictively filtering current GPS position $G_n$ along with previous GPS positions . . . $G_{n-3}$, $G_{n-2}$, $G_{n-1}$. Also, it should be appreciated that current predicted position $P_n$ represents a prediction of where the MR should be during the next interval $t_{n+1}$. In other words, predicted position $P_n$ and a next or future GPS position $G_{n+1}$ correspond to a position of the MR during a next time interval occurring after the current time interval. In the preferred embodiment, a time interval of approximately one second ensures a relatively frequent, one second interval between GPS position and predicted position updates.

Figure 3B:
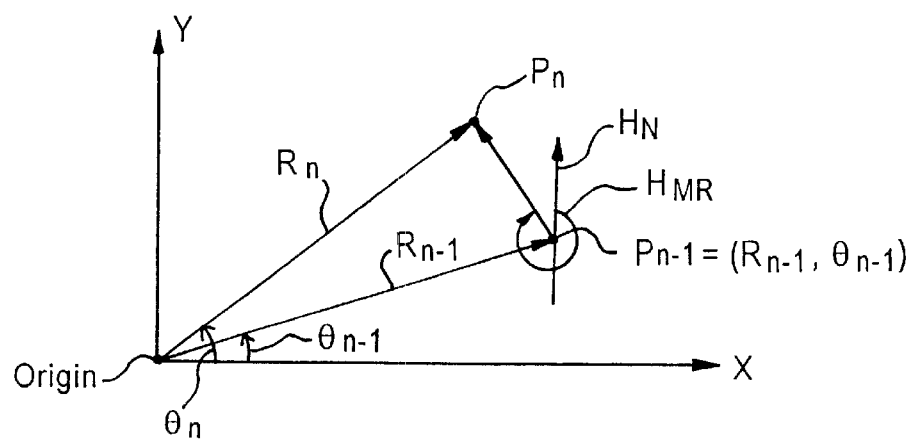
FIG. 3B is an illustration of an exemplary pair of predicted positions derived by the Kalman filter of FIG. 3A.

Each predicted position derived by KF 32 in the present invention is advantageously represented as a predicted position vector having a magnitude R and a direction θ relative to a reference coordinate axis system, as depicted in FIG. 3B. In FIG. 3B, predicted positions $P_n = (R_n, \theta_n)$ and $P_{n-1} = (R_{n-1}, \theta_{n-1})$ are depicted relative to an exemplary coordinate axis system having an Origin and orthogonal axes X and Y. It is to be understood the coordinate axis system can be any convenient system. A heading or travelling direction $H_{MR}$ of the MR between the predicted positions is a clockwise angle drawn relative to a North-pointing vector $H_N$. Processor 104 derives the heading, velocity and accelleration of the MR as needed based on the predicted positions represented in the R, θ coordinate system. Use of such coordinate system advantageously simplifies KF 32 if the GPS positions supplied to KF 32 are similarly represented in the R, θ coordinate system, as is often the case. If GPS positions are represented by orthogonal coordinates, such as X and Y, the predicted positions can also be represented by such coordinates.

As will later be described, during an initial operational stage of system 100, GPS positions derived by GPS receiver 24 are supplied directly to KF 32 without any correction of the GPS positions. However, after the initial stage, processor 104 supplies corrected GPS positions to KF 32.

As is known and as previously mentioned, the equations implemented by KF 32 to calculate predicted positions incorporate a Kalman gain k. The error feedback process for adaptively adjusting k includes:

1) calculating a positional variance error $\sigma_n$;
2) supplying variance error $\sigma_n$ to a positional variance error input of KF 32; and
3) within KF 32, adjusting gain k based on variance error $\sigma_n$.

As is also known, KF 32 derives a predicted velocity vector $v_x, v_y$ of the MR, along with each predicted position. Predicted velocity vector $v_x, v_y$ represents the speed and heading of the MR. A velocity variance error $\sigma_{vx}, \sigma_{vx}$, associated with predicted velocity vector $v_x, v_y$, is also provided to a velocity variance error input of KF 32.

Processor 104 stores the predicted positions output by KF 32 to a storage buffer 300 in main memory 106, and maintains the predicted positions in a time ordered list or sequence in buffer 300. For example, buffer 300 includes the current predicted position $P_n$ and a predetermined number of previous predicted positions, as depicted in FIG. 3. An R, θ coordinate pair is stored in buffer 300 for each predicted position in buffer 300. Processor 104 accesses predicted positions in buffer 300 as needed to execute the processes of the present invention.

The structure depicted in FIGS. 2 and 3A, used in conjunction with a navigational map database 302 stored, for example, in storage device 110, substantially reduces low and high frequency noise components corrupting the accuracy of the current predicted position output by KF 32. Using the current predicted position and a unique map matching technique, processor 102 determines a probable position of the MR coinciding with a navigable route, such as a street, represented in database 302. The MR must be located on a navigable route, although based on the derived GPS position, without the present invention the MR may appear to be located off a navigable route. The probable position is a best guess of where the MR is actually located on the street. The probable position can be displayed to an operator along with topological information, such as a grid of city streets. Also, in an initial operational phase of system 100, the structure depicted in FIGS. 2 and 3, used in conjunction with map database 302, accurately and rapidly associates a current GPS position with a probable position of the MR coinciding with the nearest navigable street.

Figures 4A, 4B:
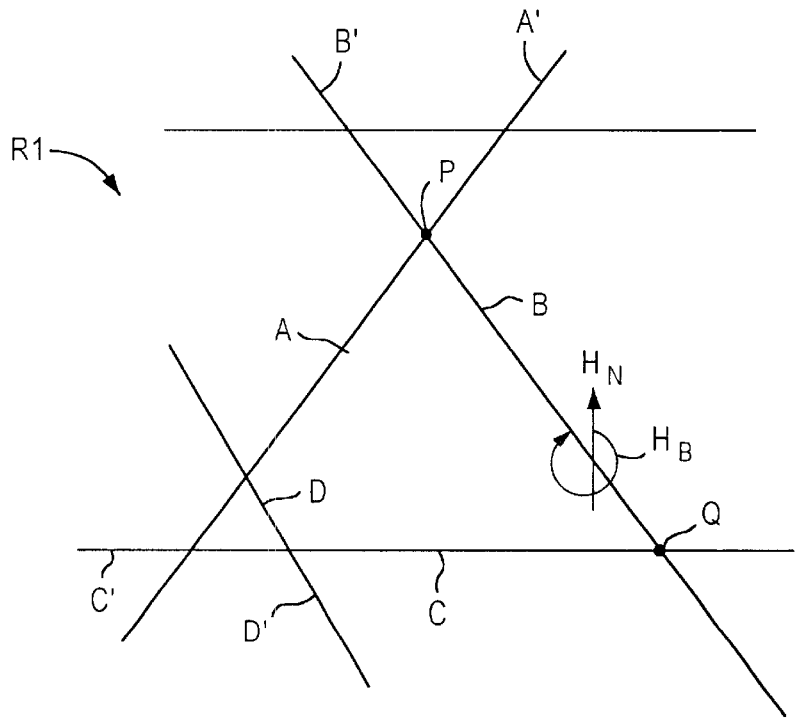
FIG. 4A is a diagram of exemplary entries for a map database used in the present invention.
FIG. 4B is a diagram of a topological region corresponding to the entries of FIG. 4A.

Navigational map database 302 resides, for example, in storage device 110 and includes entries accessible by processor 104. Processor 104 reads such map database entries from storage device 110 and writes the entries to main memory 106 for efficient subsequent access of the same entries by processor 104. Map database 302 is now described with reference to an exemplary portion 306 of map database 302, illustrated in FIG. 4A. Exemplary portion 306 of map database 302 includes a list of database entries or records L1–L6 representing navigable objects, such as streets and intersections, covering a topological or geographical region R1. Geographical region R1 is a typical city street network, as illustrated in FIG. 4B.

Each of the entries L1–L6 includes a list of valued attributes, e.g., map region, name, feature identifier, and ordered list of positional coordinates, defining the characteristics of the navigable object route for the associated entry. For example, a street A' includes a connected series of street segments defined positionally by the ordered list of positional coordinates for entry L1. Street A' includes a street segment A extending between two consecutive positional coordinates in the ordered list of coordinates for street A'. Similarly, streets B', C', and D' include associated street segments B, C, and D, as illustrated in FIG. 4B.

A heading, or direction, is associated with each street segment. For example, a clockwise angle $H_B$ drawn relative to North-pointing vector $H_N$ represents the heading of street segment B, as illustrated in FIG. 4B. When necessary, processor 104 calculates the heading of a street segment identified in database 302 based on the positional coordinates associated with the street segment. Alternatively, a heading attribute can be added to those entries of the map database featuring streets, in which case, processor 104 can read the heading associated with a street and street segment from map database 302, thus saving processing time at the expense of adding memory to system 100.

An intersection location can be explicitly identified in map database 302, e.g., the locations of the intersections identified as P and Q. Alternatively, processor 104 can calculate an intersection location by extrapolating known street segments to an intersection point between the street segments.

The operation of system 100 at a high level overview is now described with reference to the flow diagram of FIG. 5 and reference back to 4B. The process starts at step 500, and an actual location of the MR is assumed within a geographical region R1 represented in map database 302. In the initial operational phase or step 505, system 100 rapidly determines an accurate probable position of the MR. The probable position coincides with a navigable route, such as a street segment or intersection, selected from map database 302, that is nearest a current predicted position derived by KF 32. The probable position is a best guess of where the MR is actually located on a street represented in map database 302. The present invention associates the current predicted position with an accurate probable position of the MR within approximately five seconds and five GPS position updates after activation of system 100 by the user/operator.

After completing initial step 505, system 100 continues with a cyclical process represented by steps 510–545, and executed for each GPS position derived at the first step 510 in the cyclical process. At step 510, GPS receiver 24 derives a current GPS position $G_n$ during a current time interval $t_n$ associated with a loop n through the cyclical process. At step 515, processor 104 determines whether a previous turn or discernible change in the heading of the MR has been detected during a previous loop, for example loop (n−1), through the cyclical process (see step 535). If processor 104 determines a previous turn has been detected, processor 104 adjusts current GPS position $G_n$ with a low frequency correction determined from the previously detected turn of the MR (see step 540), to produce a corrected current GPS position $C_n$. Otherwise, processor 104 takes no action except to use current GPS position $G_n$ in the next step. Step 515 thus represents a feedback error correction step because current GPS position $G_n$ is corrected with information determined from a previously detected turn of the MR, and no such information is available until the turn is first detected. Step 515 substantially eliminates the previously described low frequency noise component from the current GPS position (assuming a turn has been detected).

At step 520, processor 104 filters an impossible or unlikely GPS position $G_n$, or corrected GPS position $C_n$ if a previous turn has been detected, from step 515. Such an impossible or unlikely position results from noise corrupting the GPS satellite signals. To filter such a position, processor 104 compares the current position from step 515, and a velocity and an acceleration of the MR derived from the current position and previous positions from step 515, against previous positions from step 515, and a vehicle dynamics rule base 304 stored in storage device 110. The rule base 304 includes valid velocity and acceleration ranges for the MR. Land based vehicles such as police cars have maximum accelerations and velocities. If processor 104 determines an invalid current GPS or corrected GPS position based on the comparison to the rule base 304, for example an acceleration above a maximum acceleration for the police car based on positions $G_n$ and $G_{n-1}$, then processor 104 derives an average expected position based on previous valid positions from step 515 and the vehicle dynamics rule base. Processor 104 provides the average expected position to the next step as a substitute for the invalid GPS or corrected GPS position. In this manner, processor 104 filters unreasonable vehicle positions at step 515.

At step 525, either the GPS position or the corrected GPS position (or position substitute from step 520) is supplied to KF 32 depending on whether a previous turn has been detected. Either way, KF 32 derives a current predicted position $P_n$ based on the current position and previous positions, for example $C_n$ and $C_{n-1}, C_{n-2}, C_{n-3} \ldots$, supplied from step 520. It is important to realize that step 515 advantageously removes the correlated, low frequency noise component from current GPS position $G_n$ to produce the corrected GPS position $C_n$, assuming a turn was previously detected. With the low frequency noise substantially eliminated from current corrected GPS position $C_n$, KF 32 effectively filters the remaining high frequency noise from corrected GPS position $C_n$ in deriving current predicted position $P_n$. Removing the correlated noise before the predictive filtering step by supplying current corrected GPS position $C_n$ instead of GPS position $G_n$ to KF 32 advantageously eliminates the need to modify KF 32 to account for the correlated noise. Only the uncorrelated, high frequency noise corrupting current corrected GPS position $C_n$ passes through low frequency correction step 515 and into KF 32. KF 32 advantageously filters such noise to derive current predicted position $P_n$.

At step 530, processor 104 stores current predicted position $P_n$ to buffer 300. A time ordered list of the current and previous predicted positions are maintained in buffer 300 as a history of predicted positions.

At step 535, processor 104 tests for the occurrence of a turn of the MR on the street network using map database 302 and the time ordered list of predicted positions derived by KF 32 and stored to buffer 300. Once a turn is detected, the process depicted in FIG. 5 becomes divided, or splits, into two cyclical, error correction processes; a process loop LA represented by steps 515, 520, 525, 530, 535, and 540, and a process loop LB represented by steps 525, 530, 535, and 545. The reason the process splits in two will become apparent from the following description.

In process loop LA, processor 104 derives a low frequency error or correction at step 540 during the current pass through the loop, and then, at step 515, applies the low frequency correction to the next or future current GPS position, $G_{n+1}$, coming into the loop. Therefore, from the perspective of the current GPS position $G_n$ described above with reference to step 515, the low frequency error was derived form a previously detected turn. At step 540 in loop LA, processor 104 calculates a positional offset between 1) a current probable turn position representing a best guess of where the MR actually turned on a street in map database 302, and 2) a corresponding predicted turn position determined using the history of predicted positions stored in buffer 300.

The positional offset, also referred to as the low frequency correction or displacement error vector, substantially represents the low frequency error corrupting GPS and predicted positions near the time when the turn is detected. The accuracy of the correction depends on the relationship between how frequently the MR turns and the rate at which the low frequency noise component varies. For example, if the MR turns approximately every thirty-seconds, and the time constant of the low frequency noise, such as Selective Availability and/or slowly varying multipath, is on the order of one-hundred seconds, then the low frequency correction should accurately represent the low frequency contaminating current GPS position $G_n$. As a result, such error will be substantially eliminated from current corrected GPS position $C_n$ at step 515, and thus the predicted positions derived by KF 32.

In process loop LB, processor 104 derives a high frequency correction at step 545. Processor 104 supplies the high frequency correction as a positional error variance $\sigma_n$ to KF 32 to drive Kalman gain k of KF 32. Processor 104 derives the high frequency correction by deriving a positional error between 1) the current corrected GPS position $C_n$ from step 515, and 2) a street segment coinciding with a probable position of the MR associated with a previous predicted position $P_{n-1}$ of the MR calculated during the previous pass through loop LB. Processor 104 uses corrected GPS position $C_n$ in deriving the high frequency correction even if corrected position $C_n$ was determined impossible or unlikely at vehicle dynamics filtering step 520, because KF 32 filters and predicts high frequency noise most effectively when Kalman gain k is evaluated using the high frequency error represented by such a position.

The process ends at step 547 when system 100 is turned off, reset, or when GPS receiver 24 no longer derives GPS positions.

It should be appreciated that as GPS receiver 24 and KF 32 derive GPS and predicted positions at a rate of approximately once a second, process loops LA and LB repeat at the same rate to continuously derive and apply the low frequency correction associated with turns and the high frequency positional error variance. Process LA is considered a low frequency error correction process because the positional offset calculated at step 540 changes only when system 100 detects a turn of the MR, and such turns occur relatively infrequently as compared to the rate at which GPS positions (and predicted positions) are derived. Since turns occur relatively infrequently, the positional offset associated with the turns is a relatively slowly varying quantity. In other words, the same positional offset typically corrects many consecutive GPS positions derived after the occurrence of the turn. On the other hand, process LB is considered a high frequency process because the error variance changes with each GPS and predicted position, i.e., with each iteration through loop LA. It is necessary for the process of FIG. 5 to split into separate loops LA and LB because the low and high frequency loops respectively 1) update the low and high frequency corrections at different rates, and 2) apply the low and high frequency corrections at different steps in the process and to different components in the system, as described above.

Figure 6:
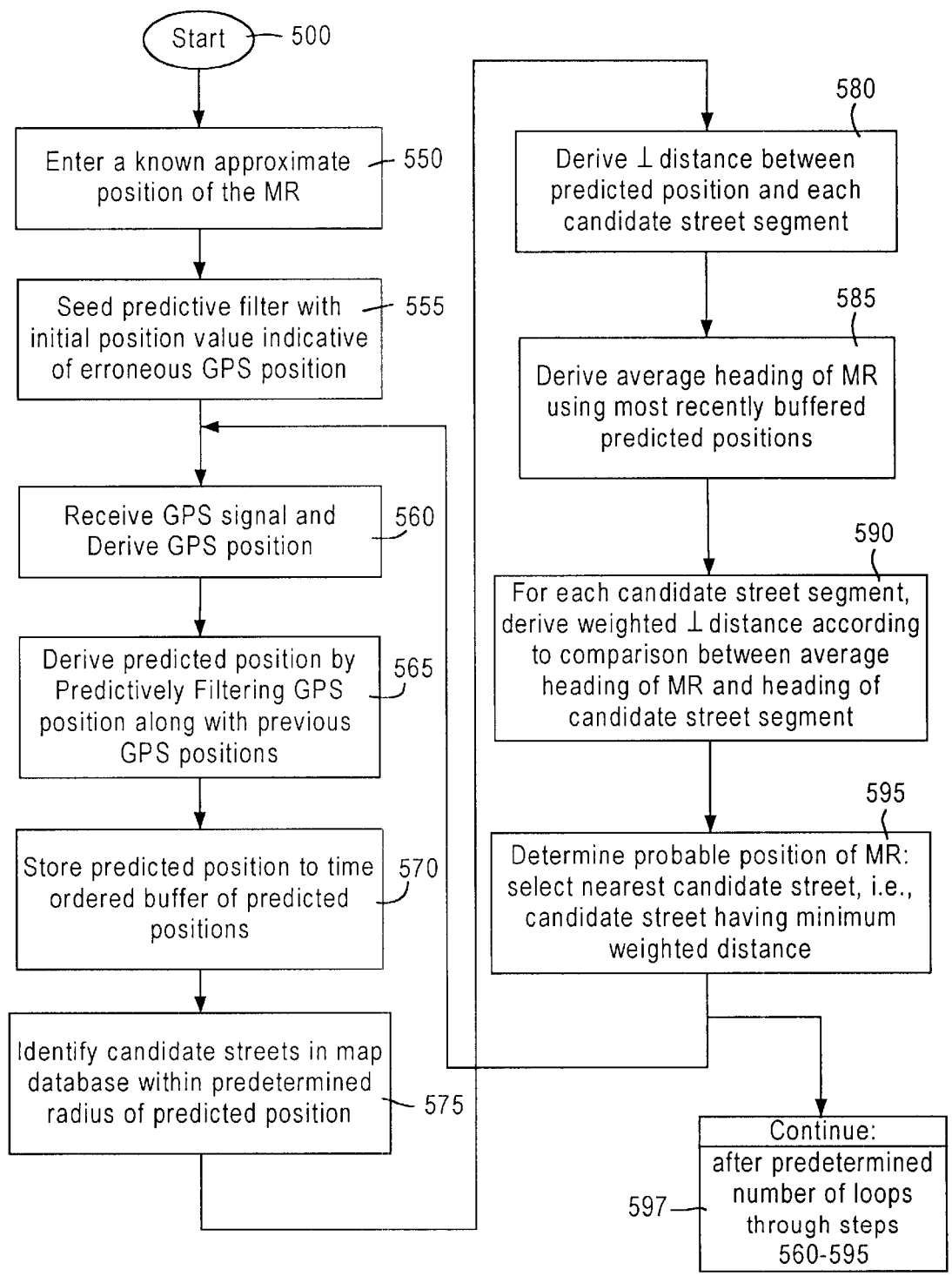
FIG. 6 is a flow diagram of a detailed process corresponding to the high level process of FIG. 5.

The foregoing high level operational steps are now described in further detail. Rapid determination step 505 is now described with reference to the flow diagram illustrated in FIG. 6. Reference is also made to an exemplary city street network or map M illustrated in FIG. 7, wherein an initial series of predicted positions $P_1$–$P_5$ of the MR is depicted. Predicted positions $P_1$–$P_5$ represent the first five predicted positions derived by KF 32 after system 100 is initially turned-on or reset at step 500. For illustrative purposes, it is assumed street network M illustrated in FIG. 7 encompasses the geographical region R1, previously described.

The process starts at step 500 after, for example, an operator/user of system 100 turns on or resets system 100. Such action places system 100 in an operational state whereby processor 104 executes instructions to effectuate the processes of the present invention, and GPS receiver 24 periodically derives GPS positions based on received GPS signals, as previously described. The initial conditions that apply at this time are as follows:

1) the operator has knowledge of only an approximate position of the MR, for example, to within several tenths of a mile of where the MR is actually positioned on street network M; and 2) the probable position of the MR is undetermined.

At step 550, the system operator/user enters an approximate position $P_{approx}$ of the MR into system 100, for example, using input device 114. As mentioned above, approximate position $P_{approx}$ should lie within several tenths of a mile of an actual position $P_{actual}$ of where the MR is actually located on street network M.

In response to the entry of $P_{approx}$, at step 555, processor 104 derives an initial position value $P_{error}$ representing an erroneous GPS position displaced a predetermined minimum distance $D_{min}$ from approximate position $P_{approx}$. Processor 104 initializes or seeds KF 32 with erroneous initial position value $P_{error}$ instead of supplying KF 32 with an initial GPS position derived by GPS receiver 24. Initial seeding of KF 32 with erroneous position $P_{error}$ forces a significant artificial increase in the initial gain k of KF 32 because of the large positional error $D_{min}$ associated with $P_{error}$. The increase in gain k is artificially induced by setting the initial error variance with $D_{min}$ at step 555, instead of with an initial GPS position derived by receiver 24. It has been demonstrated that such initial seeding enables KF 32 to rapidly arrive at an accurate predicted position of the MR. To force the required increase in Kalman gain k, predetermined minimum distance $D_{min}$ should be in the approximate range of 0.5–3 km.

At steps 560 and 565, GPS receiver 24 derives a current GPS position of the MR, in response to receipt of the GPS satellite signal over a predetermined time interval, as previously described. Processor 104 supplies the current GPS position to KF 32. KF 32 derives a current predicted position by predictively filtering the current GPS position, and previous GPS positions. It is to be understood that only one GPS position is available to KF 32 during this first pass through steps 560 and 565, however, subsequent KF solutions rely on both current and previous GPS positions.

At step 570, processor 104 stores the current predicted position to storage buffer 300. Before process flow proceeds to step 575, a second pass through steps 560–570 is required to establish a second predicted position in buffer 300 because subsequent steps requires at least two predicted positions, as will become apparent.

At steps 575–595, processor 104 determines a probable position of the MR corresponding to the most current predicted position stored in buffer 300. The probable position of the MR is the best calculated guess of where the MR is actually positioned on the street network or map M. To make this determination, beginning at step 575, processor 104 compares the current predicted position stored in buffer 300 against the positional coordinates of those entries in map database 302 identified as streets. By this comparison, processor 104 identifies candidate street segments in map database 302 lying in the vicinity of the current predicted position. Processor 104 identifies candidate street segments lying within a predetermined distance, such as a predetermined radius, of the current predicted position. The probable position of the MR will coincide with one of the candidate street segments. The magnitude of the predetermined radius depends on the statistics of the low frequency noise corrupting the GPS positions. A radius between 140 and 200 meters has been found to achieve good results. Such a radius achieves good results because it accounts for absolute and RMS, low frequency positional error contaminating the predicted positions. For example, low frequency noise, from sources such as SA and slowly varying multipath, tends to introduce GPS positional errors of up to 150 meters, thus a radius much below this number could lead to the omission of a valid candidate street segment upon which the MR is actually positioned.

Figure 7:
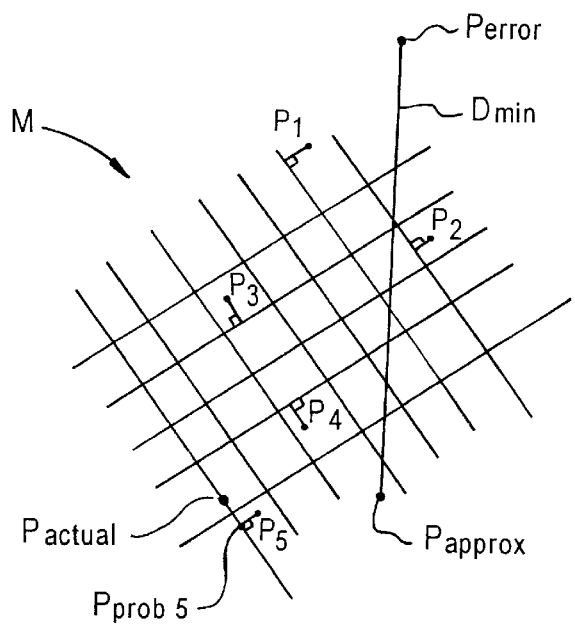
FIG. 7 is a diagram of an exemplary topological region.
Figure 8:
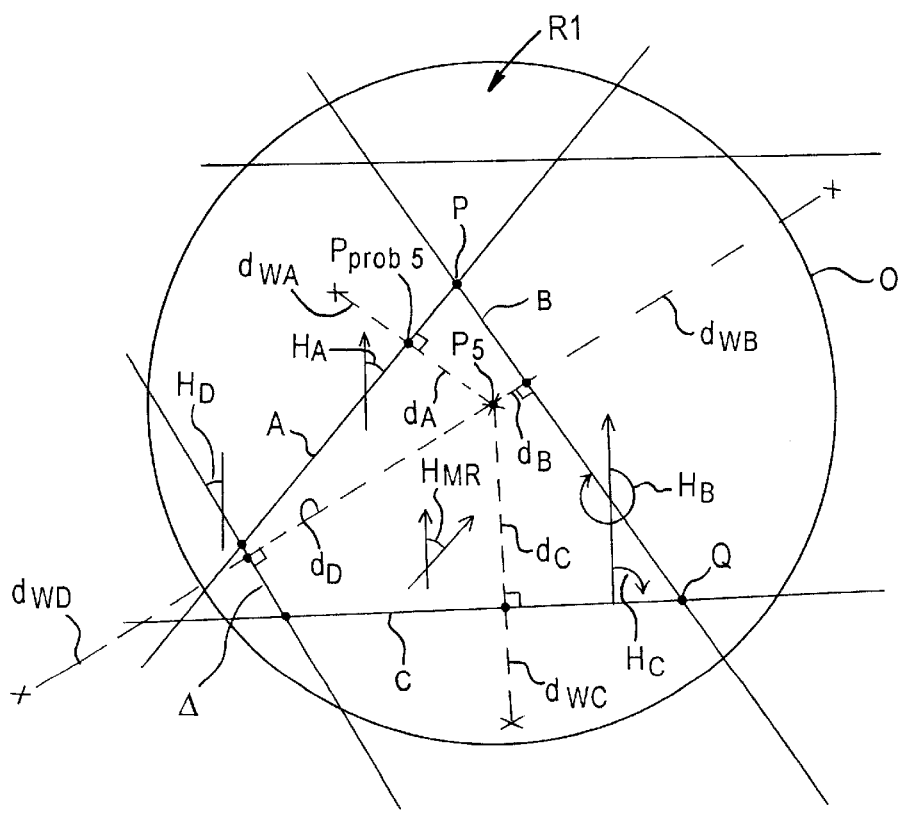
FIG. 8 is a diagram wherein a single exemplary predicted position is depicted within an exemplary topological region encompassed by the topological region of FIG. 7.

For illustrative purposes, assume the current predicted position, $P_5$ in FIG. 7, lies in the vicinity of geographical region R1 of street network M, as depicted in FIG. 8. This means a circle O having a center coinciding with current predicted position $P_5$, and a radius of at least 140 meters, substantially encompasses geographical region R1, as depicted in FIG. 8. Following this assumption, at step 575, processor 104 identifies street segments A, B, C, and D associated with streets A', B', C', and D' as candidate street segments from map database 302.

At steps 580–590, processor 104 derives a weighted distance between current predicted position $P_5$ and each of candidate street segments A–D. As will be described more fully, derivation of each weighted distance depends on 1) a perpendicular or shortest distance between current predicted position $P_5$ and the candidate street segment, and 2) an angular difference between a current heading of the MR and a heading of the candidate street segment.

With reference to FIG. 8, at step 580, processor 104 calculates the perpendicular distances $d_A$, $d_B$, $d_C$, and $d_D$ between predicted position $P_5$ and each of candidate street segments A–D.

At step 585, processor 104 derives a current average heading or travelling direction $H_{MR}$ of the MR based on current predicted position $P_5$ and previous predicted positions stored in buffer 300. Heading $H_{MR}$ represents an angle of travel relative to the North-pointing vector $H_N$, as depicted in FIG. 8. To derive heading $H_{MR}$, processor 104 first computes individual heading values (angles) between consecutive predicted positions in buffer 300, such as between $P_1$ and $P_2$, $P_2$ and $P_3$, $P_3$ and $P_4$, and $P_4$ and $P_5$. Processor 104 averages the individual heading values to derive average heading $H_{MR}$. Alternatively, heading $H_{MR}$ can be determined from the predicted velocity vectors, e.g., $v_x v_y$, derived by KF 32, as is known. System 100 thus advantageously derives the heading of the MR without resorting to external sensors, such as gyroscopes, which can be costly, and inaccurate without periodic calibration. Advantageously, the present invention eliminates the need for dead reckoning required by other known device and methodologies.

At step 590, processor 104 derives weighted or adjusted distances $d_{WA}$, $d_{WB}$, $d_{WC}$, and $d_{WD}$ corresponding respectively to each of the perpendicular distances $d_A$–$d_D$. Processor 104 derives the weighted distances in the following manner. Processor 104 first ascertains respective headings $H_A$, $H_B$, $H_C$, and $H_D$ for each of the candidate street segments A–D by either 1) calculation based on the ordered list of coordinates for each street segment, or 2) simply accessing such information in map database 302 in the event such data is stored as an attribute value in map database 302. Next, processor 104 calculates an angular difference or deviation ΔH between the MR average heading $H_{MR}$ and each of the street segment headings $H_A$–$H_D$. Therefore, in the example, processor 104 calculates four angular differences. Next, processor 104 derives weighted distances $d_{WA}$, $d_{WB}$, $d_{WC}$ and $d_{WD}$ corresponding respectively to each of the perpendicular distances $d_A$–$d_D$, in accordance with the following equation:

$$d_{Wi}=d_i+\text{DIST\_OFFSET}\times W,$$

where index i represents a street segment identifier (e.g., A, B, etc.), DIST_OFFSET is a fixed distance, such as 140 meters, and W is a weighting function, described below, that increases from a value of 0 toward a value of 1 with increases in angular offset DIST_OFFSET×W from 0° to 90°.

The weighting function adds distance (i.e., DIST_OFFSET×W) to the calculated perpendicular distance (e.g., $d_A$) associated with a given street segment (e.g., A), based on the angular difference DIST_OFFSET×W between heading $H_{MR}$ and the heading of the given street segment. If the given street segment has a heading within approximately 30° of heading $H_{MR}$, then the weighting function adds a relatively small distance to the associated perpendicular distance because of a flattened cosine shape of the weighting function. On the other hand, if the given street segment has a heading falling outside the 30° range, then the weighting function adds a relatively large distance, e.g., 140 meters, to the associated perpendicular distance.

The weighting or filtering function W has the following equation:

$$W=[1-e^{-(n/hw)^N}], \text{ where } n=[\text{Cos}(2\times\text{DIST\_OFFSET}\times W+1)]]/2,$$

and where n represents an increment from 0 to n=hw, hw is the half-width of the function, and N is a number that can be set anywhere from 0 to ∞ (infinity).

Figure 8A:
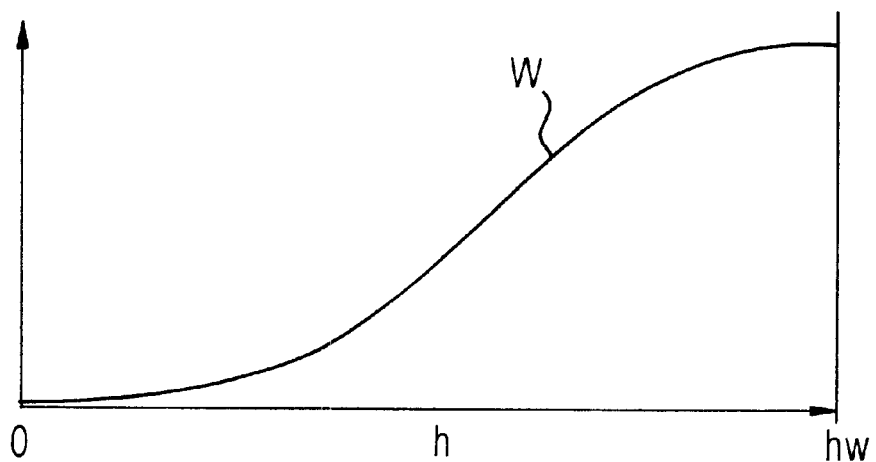
FIG. 8A is an exemplary graph of a weighting function for weighting distances in accordance with the present invention.

The weighting function W provides a controlled weighting scheme using values of N=0 (corresponding to a true gaussian shaped function) to N=∞ (corresponding to a "brick wall" rectangularly shaped function) with weighting values of W ranging from 0 to 1. FIG. 8A is an exemplary graph of the weighting function W for N=2. The filter envelope depicted in FIG. 2 is generally gaussian. Using N as the control, filter envelopes can be generated that change shape from a gaussian form, e.g., for N=2, to a rectangular form, e.g., N=∞. Typically, N is set in the range of 5 to 15, and hw is set in the range between 0.5 to 1.5.

As defined above, n is a modified cosine function providing a weighting of 1 when DIST_OFFSET×W=0°, 0 when DIST_OFFSET×W=0°, and 1 when DIST_OFFSET×W=180°.

This means that street segments that parallel the MR heading are preferentially weighted as compared to street segments perpendicular to the MR heading. n is applied to the overall weighting function W to give an overall weighting between 0 and 1.

An example of the effect of the weighting function is illustrated in FIG. 8, wherein weighted distance $d_{WB}$ is substantially greater than weighted distance $d_{WA}$ even though perpendicular distance $d_B$ is less than perpendicular distance $d_A$. This reversal in magnitudes occurs because heading $H_A$ of street segment A is more closely aligned with $H_{MR}$ than is heading $H_B$ of street segment B. By adding the relatively large distance to a street segment heading in a substantially different direction to the direction of the MR, the weighting function appropriately reduces the probability of the map matching algorithm selecting such a street segment.

At the same time, the map matching technique of the present invention advantageously reduces the probability of eliminating a valid street segment when the vehicle heading includes error because the algorithm does not simply eliminate a candidate street segment when the headings of the vehicle and street segment fail to match, as is done in U.S. Pat. No. 5,087,919. Instead, the algorithm of the present invention derives a weighted distance for each candidate street segment based on the difference in heading between the vehicle and each street segment, and selects a nearest weighted street segment.

At step 595, processor 104 selects from candidate street segments A–D the street segment nearest current predicted position $P_5$, based on weighted distances $d_{WA}$–$d_{WD}$. Simply stated, processor 104 selects the street segment associated with the minimum weighted distance. Having selected the nearest street segment, e.g., street segment A, processor 104 determines a current probable position of the MR. In the example, probable position $P_{prob5}$ coincides with a position on the nearest weighted street segment A. Specifically, probable position $P_{prob5}$ coincides with the intersection between nearest weighted street segment A and a line drawn perpendicularly to nearest weighted street segment A and passing through current predicted position $P_5$.

The series of steps 560–595 are repeatedly executed as described above for each current predicted position derived by KF 32. As depicted in FIG. 7, a probable position associated with each predicted position $P_1$–$P_5$ is indicated by a perpendicular line drawn between each of the probable positions and an associated nearest weighted street segment. The distance between the actual position $P_{actual}$ of the MR and each probable position rapidly decreases with each iteration because of the large gain k of KF 32 induced by the initial seeding at step 555. Within approximately five iterations and five seconds, probable position $P_{prob5}$ and actual position $P_{actual}$ of the MR share a coinciding street and heading. A probable position, $P_{prob5}$, within an approximate range of ten to thirty meters of the actual position, $P_{actual}$, of the MR can be attained within the five seconds, depending on the value of $D_{min}$.

After a predetermined number of iterations through steps 560–595, at step 597, the process continues to step 510 described with reference to FIG. 5. The predetermined number of iterations is preferably no more than five or six.

The process by which system 100 detects a turn or discernible change in heading of the MR (step 535) and derives the low frequency error correction from the turn (step 540) is now described in detail with reference to the flow diagram of FIG. 9. Reference is also made to an illustrative example, wherein a series of consecutive predicted positions $P_1$–$P_{10}$, depicted in FIG. 10A, correspond to an actual travelling path of the MR in geographical region R1, first along street segment A, through a turn at intersection P, and then along street segment E. Predicted positions $P_1$–$P_{10}$ are depicted within geographical region R1 in FIG. 10A, and in storage buffer 300 in FIG. 10B.

The process starts at step 650. As previously described, at step 530, processor 104 stores to buffer 300 the current predicted position, P10, derived by KF 32. Buffer 300 is a first-in-first-out (FIFO) buffer. It is assumed FIFO 300 stores the N most recent current predicted positions from KF 32, where N=10. After step 530, current predicted position $P_{10}$ and previous predicted positions $P_1$–$P_9$ are stored in FIFO 300, as depicted in FIG. 10B.

Figure 5:
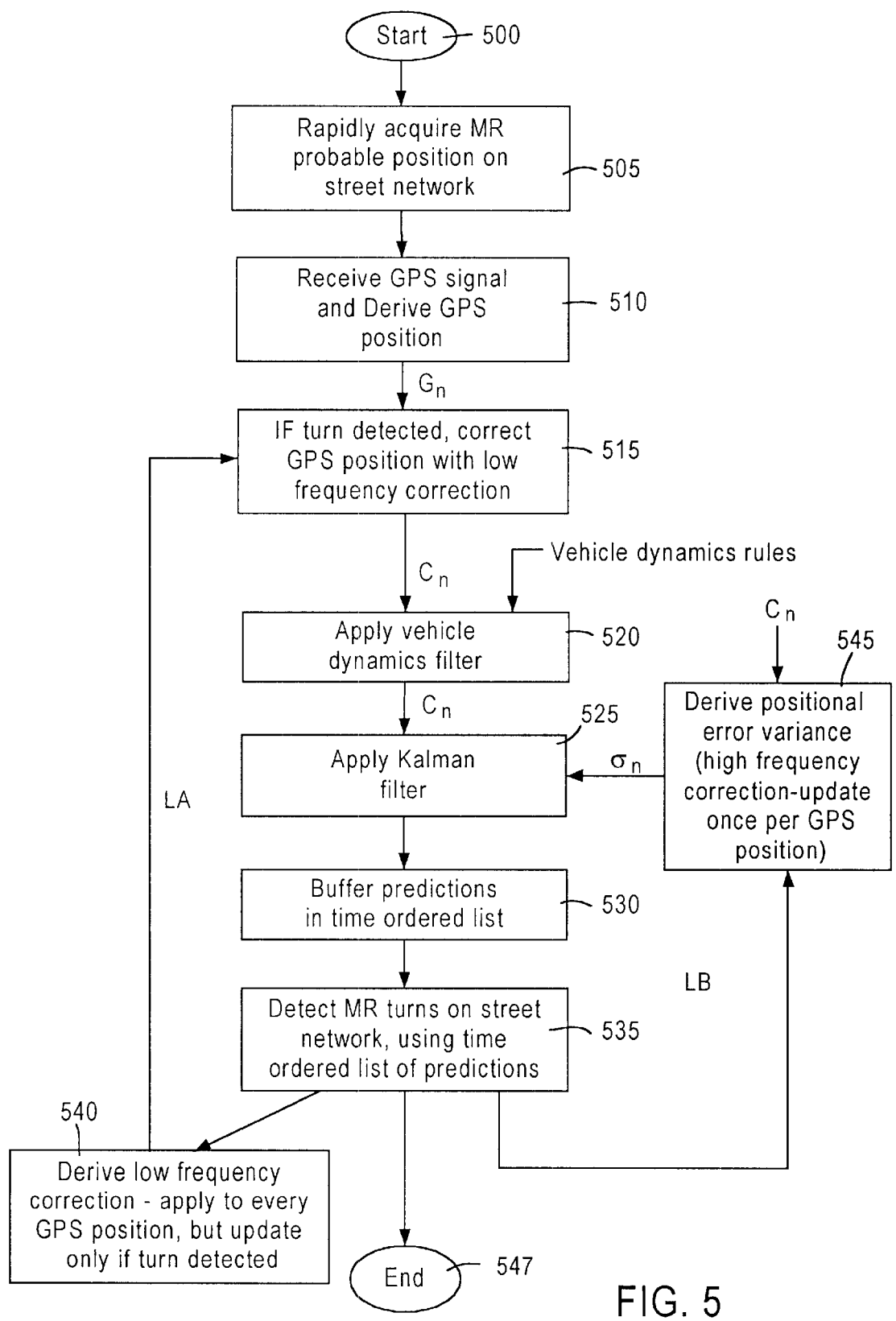
FIG. 5 is a high level flow diagram of an embodiment of the process executed by the system of FIG. 2.
Figure 9:
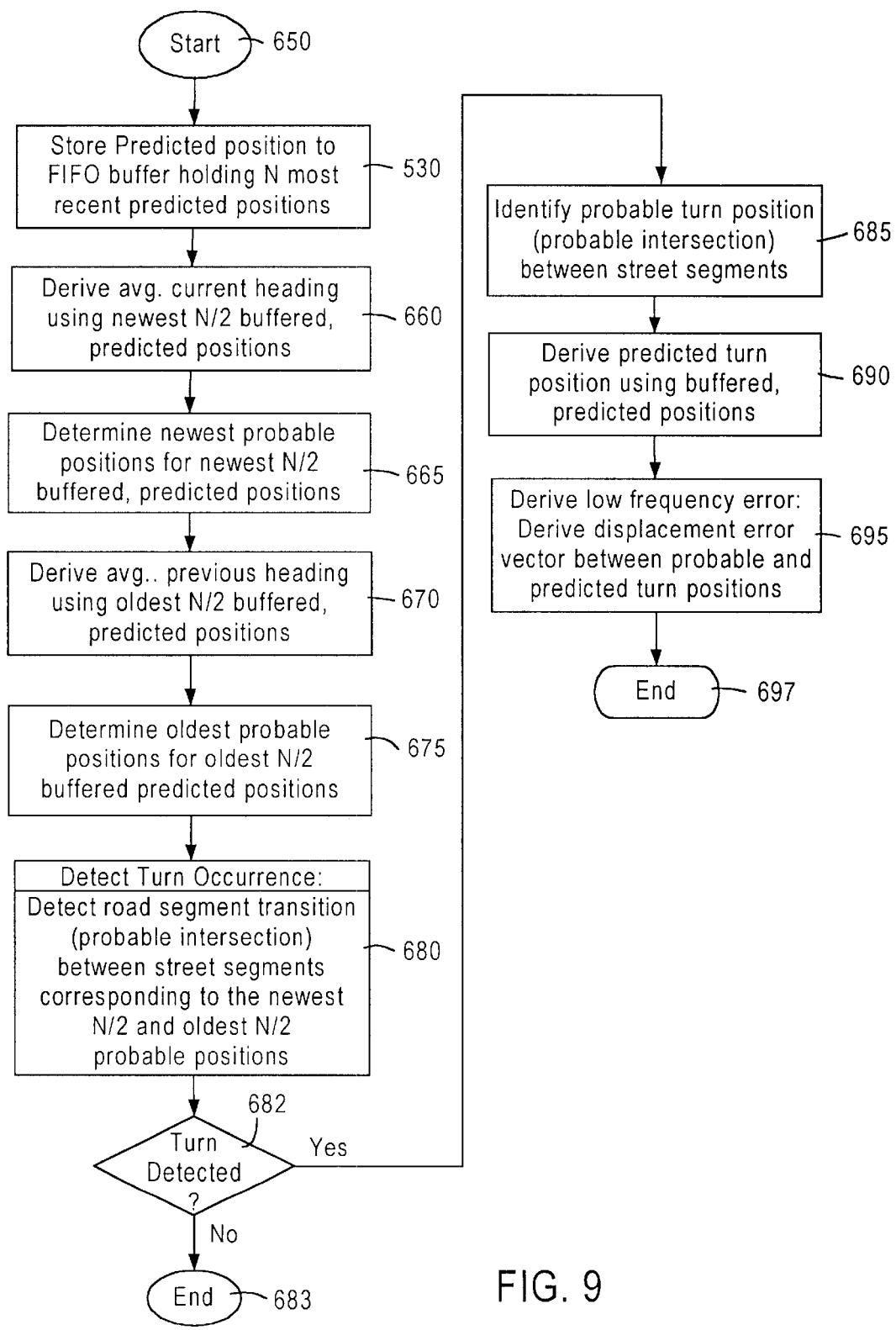
FIG. 9 is a flow diagram of a detailed process corresponding to the high level process of FIG. 5.

The next series of steps 660–680 of FIG. 9 correspond to turn detection step 535 of FIG. 5. At step 660, processor 104 derives an average current heading for the MR based on the most recent N/2 predicted positions in FIFO 300. For example, processor 104 derives the average current heading based on the most recent predicted positions $P_6$–$P_{10}$. Processor 104 derives the average heading from the predicted positions using the technique previously described with reference to step 585, or using any other suitable technique so long as predicted positions are used.

At step 665, processor 104 determines a probable position coinciding with a street segment for each of the most recent predicted positions $P_6$–$P_{10}$ in FIFO 300. Processor 104 derives the probable positions using the technique previously described with reference to steps 575–595, and based on the average current heading for the MR derived in step 660. Processor 104 stores the probable positions and coinciding street segment identifiers corresponding to each of the predicted positions P6–P10 in a storage buffer 310 associated with FIFO 300, as depicted in FIG. 10B. A street segment identifier can be, for example, a pair of end-point coordinates of the street segment or any other convenient mechanism for uniquely identifying the street segment. Storage buffer 310 includes a list of entries or records having a one-to-one correspondence with the predicted positions $P_1$–$P_{10}$. Each entry in buffer 310 stores a probable position and a street segment identifier for the corresponding probable position.

At step 670, processor 104 derives an average previous heading for the MR based on the oldest N/2 predicted positions in FIFO 300, for example, based on oldest predicted positions $P_1$–$P_5$. At step 675, processor 104 determines a probable position for each of the oldest predicted positions $P_1$–$P_5$ in FIFO 300. Processor 104 stores the probable positions and coinciding street segment identifiers to storage buffer 310.

At step 680, processor 104 determines whether the MR has turned. Processor 104 makes this determination by examining the street segment identifiers stored in storage buffer 310. In the preferred embodiment, processor 104 searches within storage buffer 310 for a street segment transition, and determines the occurrence of a turn when:

1) the newest predicted positions $P_6$–$P_{10}$ and the oldest predicted positions $P_1$–$P_5$ are respectively associated with first and second street segments. This occurs when a street segment transition occurs at the midpoints of FIFO 300 and associated buffer 310; and 2) at least a predetermined angular difference, such as between 25° and 30°, exists between respective headings of the first and second street segments, thus indicating a change in direction or heading of the MR.

As depicted in FIG. 10B, the street segment identifiers stored in buffer 310 indicate the occurrence of a turn between predicted positions $P_5$ and $P_6$ because all of the newest predicted positions $P_6$–$P_{10}$ point to street segment A, while all of the oldest predicted positions point to street segment E. Such a midpoint, street segment "flip" within buffer 310 indicates a turn of the MR, assuming an angular difference in the approximate range of 25° to 35° between the headings of street segments A and E. It is to be understood that a bend on a single street also qualifies as a turn for the purposes of the present invention, as long as the MR changes direction by at least 25° along the bend, as indicated by the current and previous headings, as described above.

At step 682, processor 104 determines whether a turn was detected during the current loop through the overall process. In the absence of a detected turn, the process associated with detecting a turn ends at step 683, and no low frequency error is derived because no turn was detected during the current loop. Otherwise, assuming the detection of a turn, processor 104 uses information about the turn to derive the low frequency correction, in the following manner. The next series of steps 685–695 of FIG. 9 correspond to low frequency derivation step 540 of FIG. 5. At step 685, processor 104 identifies a probable turn position coinciding with a map based intersection of the first and second street segments identified at step 680. Assuming the MR is travelling along the streets represented in map database 302, and is not therefore travelling off-road, the probable turn position represents a best guess as to where the MR actually turned. If map database 302 includes such an intersection then such is identified as the probable turn position of the MR. Otherwise, processor 104 calculates an intersection point between the street segments by extrapolating each of the street segments. In the example, processor 104 identifies intersection P as the probable turn position because street segments A and E intersect at intersection P.

At step 690, processor 104 derives a predicted turn position, corresponding to the probable turn position derived at step 685, based on the predicted positions in FIFO 300 and the current and previous headings derived at steps 660 and 670, as will be described below. The predicted turn position is a best estimate or prediction of where the predicted positions indicate the MR turned. The present invention recognizes that a series of predicted positions derived by KF 32 near the time of a turn of the MR exhibits a characteristic over-shoot phenomenon. The over-shoot phenomena is used in the present invention in 1) verifying a turn occurrence, and 2) increasing the positional accuracy of the predicted turn position.

Figure 10A:
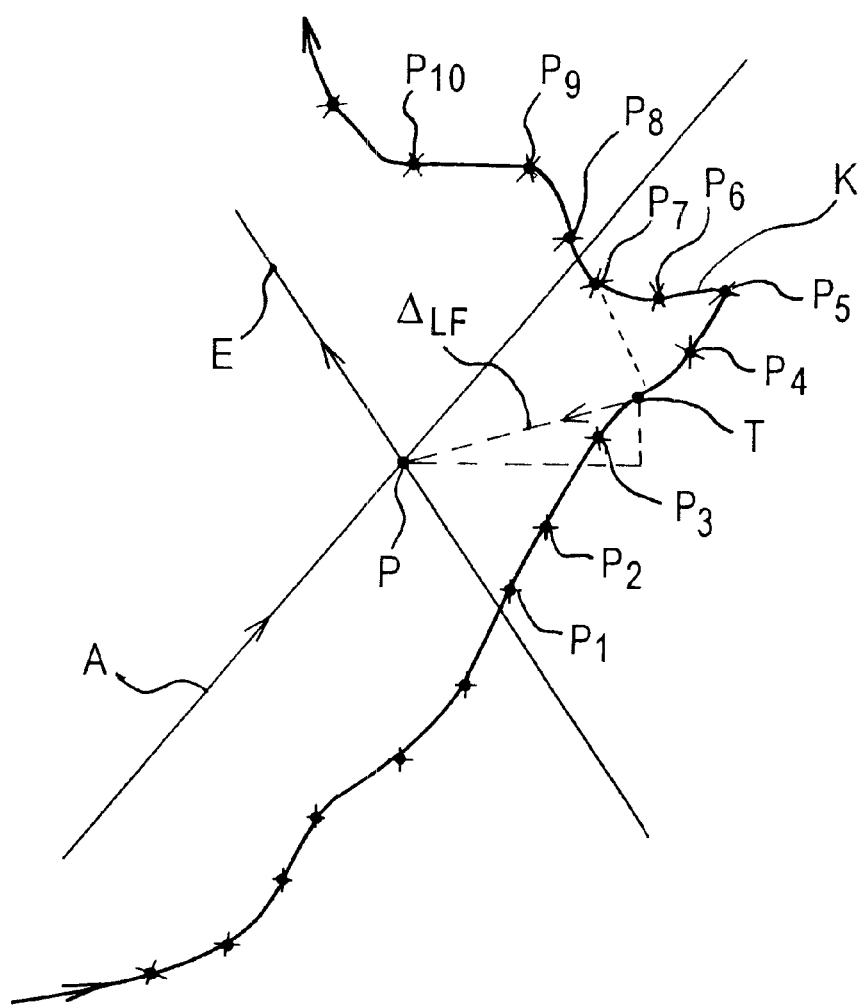
FIG. 10A is a diagram wherein an exemplary series of predicted positions of a mobile receiver are depicted within an exemplary topological region corresponding to the topological region of FIG. 7.
Figure 10B:
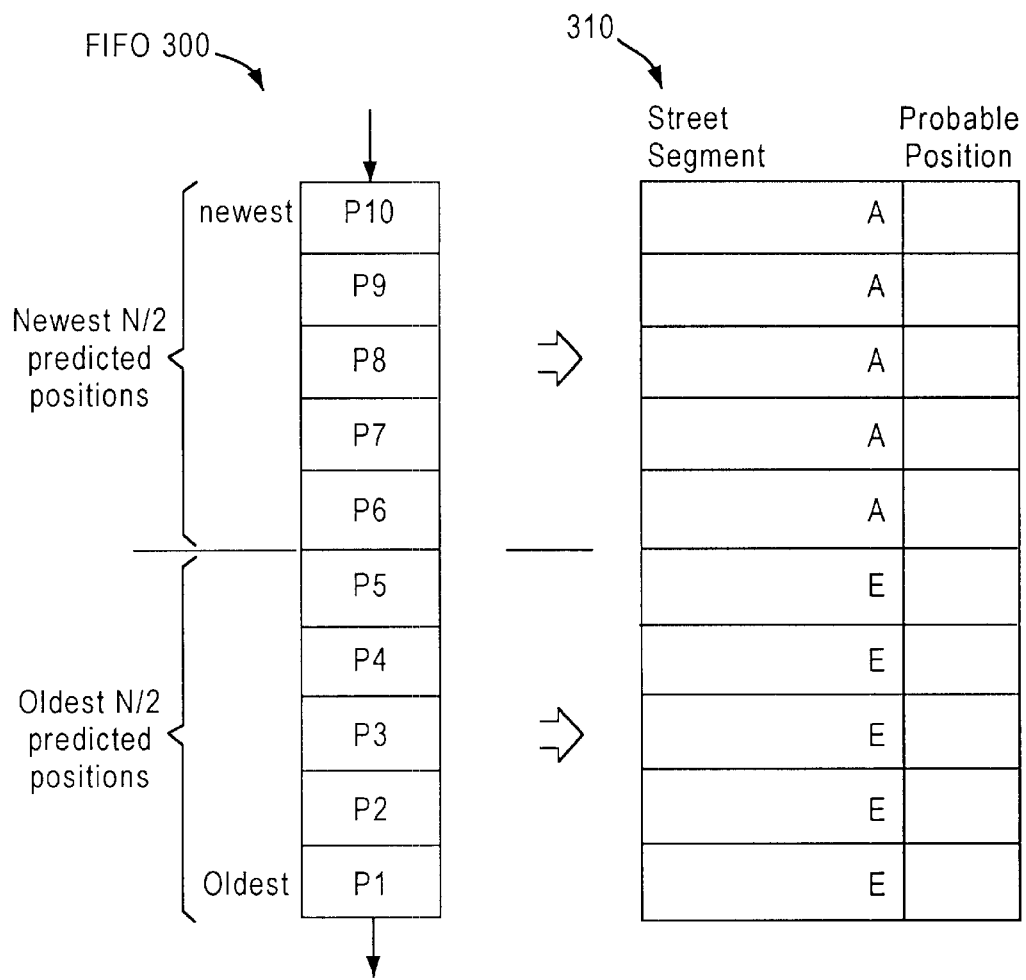
FIG. 10B is a diagram of the contents of the storage buffer of FIG. 3 and the entries in an associated buffer, corresponding to the occurrence of a turn of a mobile GPS receiver of the present invention.

In the example, processor 104 derives a predicted turn position T based on predicted positions $P_1$–$P_{10}$, as depicted in FIG. 10A. The characteristic overshoot phenomena of KF 32 is illustrated in FIG. 10A as a "beak-shaped" path segment K traced-out by predicted positions $P_4$–$P_7$. Path segment K is associated with the turn of the MR at intersection P, and results from an under-damped filter response time of KF 32. Processor 104 examines the predicted positions in buffer 300 to detect or identify beak-shaped path segment K indicative of a turn, to validate the earlier detection of the turn. Next, processor 104 derives predicted position T based on the predicted positions using a known extrapolation technique, modified to account for the over-shoot of KF 32. The modified extrapolation technique tends to ignore or de-emphasize predicted positions P4–P6. It should be appreciated that identifying the beak-shaped segment can be used in identifying turns at step 680 as well as in deriving a turn position at step 690.

Next, at step 695, processor 104 derives a displacement error vector $D_{LF}$ between probable and predicted turn positions P and T of the MR. Displacement error vector $D_{LF}$ substantially represents the low frequency or correlated positional error corrupting the GPS positions for the following reason. If KF 32 derives predicted positions based on the GPS positions corrupted by the low frequency error, then the predicted positions are similarly corrupted by the low frequency error because KF 32 is unable to effectively eliminate correlated error—this is known. Because predicted turn position T is determined based on predicted positions stored in FIFO 300, predicted turn position T necessarily exhibits the same low frequency error corrupting the predicted positions (and the GPS positions). On the other hand, because probable turn position P represents a best guess of the actual turn position of the MR, it follows that error vector $D_{LF}$ between the actual turn position of the MR and corrupted, predicted turn position T is indicative of the low frequency error corrupting the GPS positions. Stated simply, if KF 32 could effectively filter out the low frequency positional error corrupting the GPS positions, then probable and predicted turn positions P and T would coincide—however, this is not the case, and positional displacement $D_{LF}$ between the two represents the low frequency error.

At step 697, the process associated with deriving the low frequency error ends.

As is known, standard or unmodified KF 32 does not effectively filter correlated, low frequency noise corrupting GPS positions. Consequently, at step 515, processor 104 eliminates such noise from the GPS positions before supplying the GPS positions to KF 32. To eliminate the noise, processor 104 adjusts the current GPS position with displacement error vector $D_{LF}$ to produce a current corrected GPS position from which the low frequency positional error is eliminated. KF 32 then derives a current predicted position based on the current corrected GPS position.

On the other hand, KF 32 continues to "see" the uncorrelated, high frequency noise corrupting the current corrected GPS position. As is known, KF 32 can filter the high frequency noise. Recognizing this, the present invention does not remove such noise from the current corrected GPS position. Instead, the present invention increases the effectiveness with which KF 32 filters the high frequency noise by supplying a high frequency correction to KF 32. Processor 104 derives the high frequency correction factor, at step 545, based in part on the low frequency correction factor derived at step 540. Processor 104 supplies the high frequency correction factor as a variance error to KF 32 to enable the Kalman gain k of KF 32 to accurately track the high frequency noise component corrupting the corrected GPS position.

Figure 11:
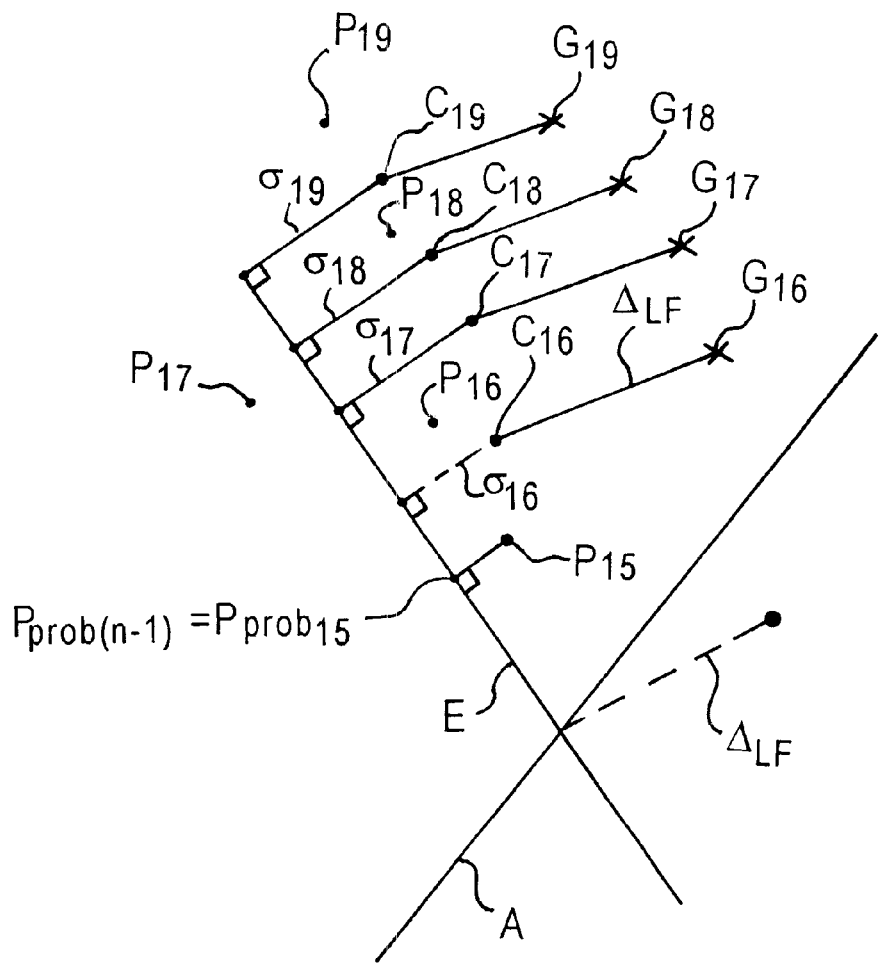
FIG. 11 is a diagram wherein an exemplary series of predicted positions of a mobile GPS receiver are depicted within an exemplary topological region corresponding to the topological region of FIG. 7.

The process by which processor 104 derives the high frequency correction is now described in further detail with reference to FIG. 5 and to an exemplary series of GPS positions $G_{16}$–$G_{19}$ depicted in FIG. 11 along with associated predicted positions $P_{15}$–$P_{18}$. It is assumed the GPS positions $G_{16}$–$G_{19}$ are derived by GPS receiver 24 at some time after processor 104 detects the turn of the MR at intersection P, and located in the vicinity of geographical region R1.

Figure 12:
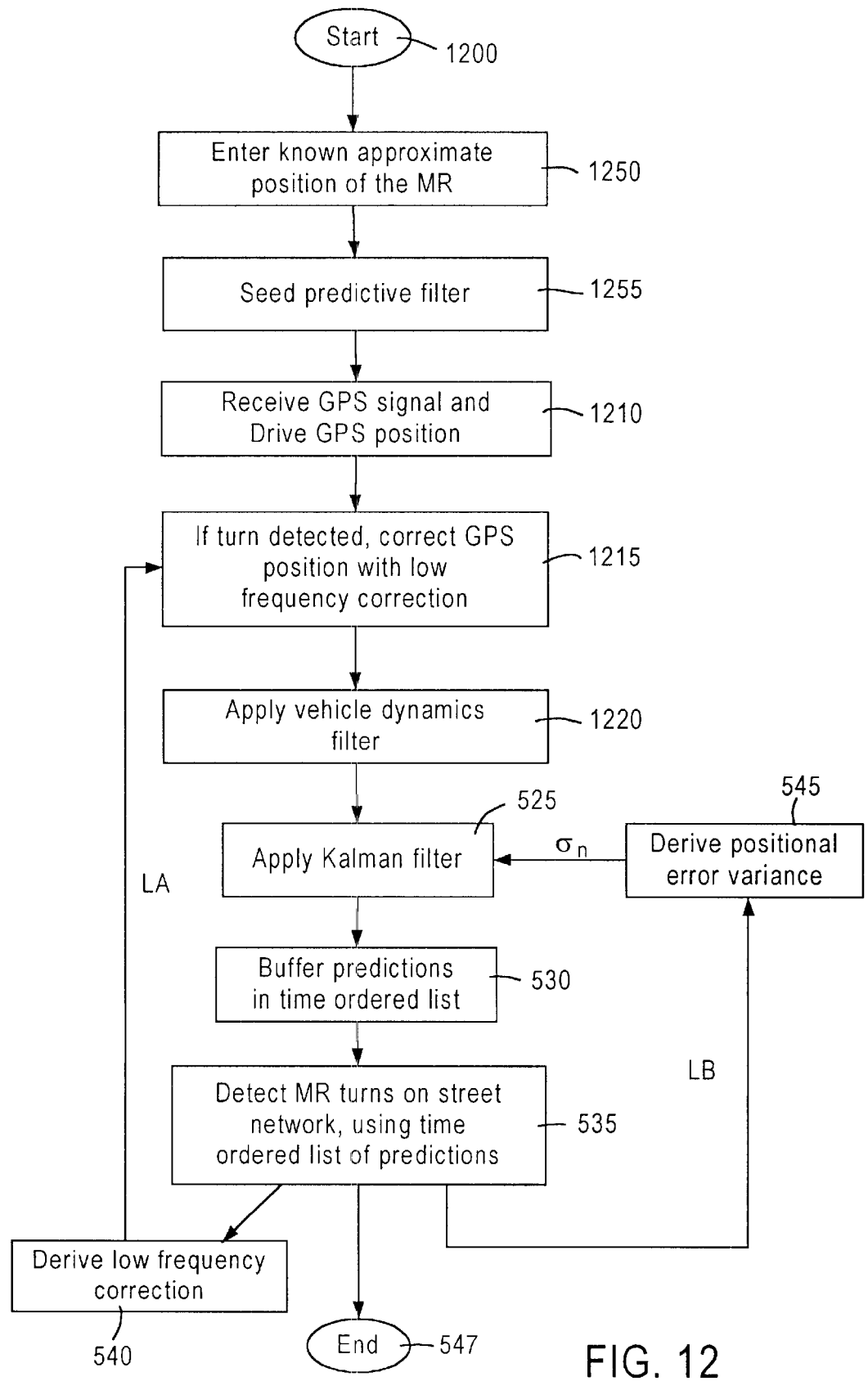
FIG. 12 is a high level flow diagram of an alternative embodiment of the process executed by the system of FIG. 2.

As previously described, at step 510, GPS receiver 24 derives a current GPS position $G_n$ during a time interval $t_n$. GPS position $G_n$ and the previous predicted position $P_{n-1}$, derived by KF 32 during a previous time interval $t_{n-1}$, are an associated pair of positions because both represent an estimate of where the MR should be during the time interval $t_n$. For example, as depicted in FIG. 12, both GPS position $P_{16}$ and predicted position $P_{15}$ represent estimates of where the MR should be during time interval $t_{16}$.

As previously described, at step 515, processor 104 derives a corrected GPS position $C_n$ by adjusting GPS position $P_n$ with the current displacement error vector derived based on a previous turn. For example, processor 104 derives corrected GPS position $C_{16}$ by applying displacement error vector $D_{LF}$ to GPS position $P_{16}$. Displacement error vector $D_{LF}$ is the positional error associated with the turn at intersection P.

As previously described, at step 525, KF 32 derives a current predicted position $P_n$ based on corrected GPS position $C_n$. At step 540 processor 104 derives a current displacement error vector, if a current turn is detected. Otherwise, processor 104 uses the previous displacement error vector, e.g., $D_{LF}$. Processor 104 applies the displacement error vector derived at step 540 to the next GPS position $P_{n+1}$ in the next pass through Loop LA.

In loop LB, processor 104 derives the high frequency correction as the perpendicular distance between current corrected GPS position $C_n$ and the street segment associated with a previous probable position $P_{prob(n-1)}$ associated with a previous predicted position $P_{n-1}$. Both current corrected GPS position $C_n$ and previous probable position $P_{prob(n-1)}$ correspond to where the MR should be located during time interval $t_n$. The perpendicular distance represents a best guess of the positional error variance associated with corrected GPS position $C_n$. In the example illustrated in FIG. 11, processor 104 derives perpendicular distance $\sigma_{16}$ between corrected GPS position $C_{16}$ and street segment E coinciding with previous probable position $P_{prob15}$. Also illustrated in FIG. 12 are the next four GPS positions $P_{17}$–$P_{19}$ and the associated error variances $\sigma_{17}$-$\sigma_{19}$ derived by processor 104 in the next four iterations through loop LB corresponding to GPS positions $P_{17}$–$P_{19}$. For each current GPS position, a new or current error variance is calculated and supplied to KF 32.

The process embodied in FIG. 5 and described in detail above loops through steps 550–595 of initial step 505 approximately five times to complete the initial phase, after which, the process moves on to the next phase, beginning with step 510. Advantageously, processor 104 does not waste process steps in the initial phase attempting to detect a turn of the MR because more than five GPS positions are required to detect such a turn. On the other hand, initial step 505 and turn detection step 535 include a duplicative series of steps to calculate probable positions of the MR.

An alternative embodiment of the process of the present invention, illustrated in FIG. 12, streamlines the process described above by 1) eliminating such duplicative steps from the initial phase 505, and 2) relying on probable positions derived at turn detection step 505, instead of cycling through the initial series of steps in initial phase 505 to derive the probable positions. The alternative embodiment of FIG. 12 thus represents an efficient or streamlined rearrangement of the steps previously described.

The alternative embodiment of FIG. 12 retains as initial steps 1) entering a known approximate position at step 550, and 2) seeding the predictive filter at step 555. The process continuously loops through the remaining steps depicted in FIG. 12, as each current GPS position $G_n$ is derived. As with the previous embodiment, after approximately five iterations through the remaining steps depicted in FIG. 12, an accurate probable position of the MR will be available in buffer 304 for display to an operator. The process derives the probable positions at step 535 to determine whether a turn of the MR occurred, as previously described. At least ten GPS positions and thus ten iterations through the remaining steps are required to detect a first turn of the MR. After the first turn is detected, process loops LA and LB derive the low and high frequency corrections as previously described.

As is now readily apparent from the foregoing description, the system of the present invention derives accurate MR positions and predicted positions using a satellite signal receiver, such as a GPS receiver, a Kalman filter, and a processor executing instruction in accordance with the present invention. Advantageously, the present invention achieves such accurate results without an additional external sensor, such as a gyroscope, and without a dead reckoning technique that typically uses such an external sensor. Also, low frequency noise is mitigated in the present invention without expensive and complicated modifications to the known Kalman filter algorithm. The present invention also rapidly and accurately associates a position of the MR with a position on a navigable route within five seconds or less by initially forcing the gain of a predictive filter to an artificially high level, and then applying a flattened cosine weighting function in a map matching algorithm to advantageously increase the probability that the MR position is correctly map matched to a known navigable route.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of rapidly associating a position of a mobile receiver (MR) with a navigable route accessible in a map database, the map database including information representing predetermined navigable routes, comprising:

seeding a predictive filter with an initial value indicative of an erroneous current position value of the MR displaced a predetermined minimum distance from a known approximate position of the MR to establish an initial gain of the predictive filter;

receiving a positional signal over m time periods and deriving position values of the MR over the m time periods using the received signal;

deriving predicted position values of the MR over the m time periods by predictively filtering the position values with the predictive filter; and determining a probable position of the MR at an end of the m time periods using a current predicted position value, the probable position coinciding with a navigable route of where the MR is probably positioned at the end of the m time periods.

2. The method as recited in claim 1, wherein the positional signal comprises a plurality of GPS satellite signals wherein each of the positional signals includes errors to reduce the positional accuracy of each of the positional signals and wherein the mobile receiver is a GPS receiver.

3. The method as recited in claim 2, comprising identifying candidate navigable routes in the map database within a predetermined distance of the current predicted position value; and deriving a weighted distance between each of the candidate navigable routes and the current predicted position value using a shortest distance and a difference in direction between each of the candidate navigable routes and the MR, the probable position coinciding with a position on one of the candidate navigable routes associated with a minimum weighted distance.

4. The method as recited in claim 3, wherein said step of deriving a weighted distance includes the step of:

adding a variable distance to each shortest distance, the variable distance progressively increasing from a minimum distance to a maximum distance with an increasing difference in the direction between the associated candidate navigable route and the MR.

5. The method as recited in claim 4, wherein the variable distance is a sinusoidally varying function of the difference in the direction between the associated candidate navigable route and the MR.

6. The method as recited in claim 4, further including the step of storing the predicted position values in a time ordered list of predicted position values, and wherein said step of deriving a weighted distance for each of the candidate navigable routes includes the step of comparing the direction of each of the candidate navigable routes to an average direction of the MR derived using the predicted position values stored in the time ordered list.

7. The method as recited in claim 2, wherein the predictive filter is a Kalman filter, wherein the predetermined minimum distance is in the approximate range of 0.5 to 3 kilometers, and wherein m is less than 6.

8. A method of accurately determining the position of a mobile receiver (MR) based upon a received positional signal having relatively low and high frequency noise components corrupting the positional accuracy of the received signal, comprising:

(a) detecting a turn of the MR using the received positional signal and deriving a first positional offset associated with the turn and representative of the low frequency noise component;

(b) deriving a position value of the MR using the received positional signal after detecting the turn, and correcting the position value with the first positional offset associated with the turn to derive a corrected position value; and (c) applying the corrected position value to a filter along with a second positional offset associated with the corrected position value and representative of the high frequency noise component to derive a filtered position value substantially free of the low and high frequency noise components.

9. The method of claim 8, wherein said steps (a) through (c) are executed without applying a dead reckoning algorithm that uses an external sensor other than a satellite signal receiver.

10. The method of claim 8, wherein said steps (a) through (c) are repeated continuously to derive subsequent filtered position values substantially free of the low and high frequency noise components.

11. The method of claim 8, comprising deriving position values using the received positional signal;

predictively filtering the position values with a predictive filter to derive predicted position values; and detecting the turn and deriving a predicted turn position using the predicted position values, the first positional offset representing a distance between the predicted turn position and a probable turn position of where the MR probably turned on a navigable route represented in a map database and selected from the map database using a map matching algorithm.

12. The method as recited in claim 11, wherein the positional signal comprises a plurality of GPS satellite signals wherein at least one of the positional signals includes the low frequency and high frequency noise component, wherein the mobile receiver is a GPS receiver, and wherein the predictive filter is a Kalman filter.

13. The method as recited in claim 12, wherein the second positional offset is applied to the Kalman filter as a positional variance error to control a Kalman gain of the Kalman filter.

14. The method as recited in claim 12, wherein the high frequency noise component includes noise frequencies in the approximate range of 2 Hz or more, and the low frequency noise includes noise caused by at least one of Selective Availability and multipath reflections.

15. The method of claim 8, wherein the second positional offset represents a shortest distance between the corrected position value and a probable navigable route coinciding with where the MR is probably located, the probable navigable route being determined by map matching a predicted position value derived by the predictive filter after the turn of the MR is detected to the navigable route.

16. A method of accurately determining the position of a mobile receiver (MR) based upon a received positional signal having low and high frequency components corrupting the positional accuracy of the received signal, comprising:

(a) receiving the positional signal over time intervals $T_1$ through $T_m$, where T represents the duration of each time interval and the subscript represents the position of each time interval in the sequence of time intervals $T_1$ through $T_m$;

(b) deriving position values of the MR at time intervals $T_1$ through $T_m$ using the received positional signal;

(c) predictively filtering the position values at time intervals $T_1$ through $T_{m-1}$ with a predictive filter to derive predicted position values of the MR at time intervals $T_1$ through $T_{m-1}$;

(d) deriving a first positional error indicative of a low frequency noise component reducing the accuracy of the position values and predicted position values at time intervals $T_1$ through $T_m$ using predicted position values $T_1$ through $T_{m-1}$;

(e) correcting the position value at time interval $T_m$ with the first positional error to derive a corrected position value at time interval $T_m$; and (f) predictively filtering the corrected position value at time interval $T_m$ to derive a predicted position of the MR at time interval $T_m$, the predicted position at time interval $T_m$ being substantially free of the low frequency noise component.

17. The method as recited in claim 16, wherein the positional signal comprises a plurality of GPS satellite signals wherein at least one of the positional signals includes the low frequency and high frequency noise component, and wherein the mobile receiver is a GPS receiver.

18. The method as recited in claim 17, comprising detecting a turn and determining a predicted turn position of the MR using the predicted position values at $T_1$ through $T_{m-1}$;

associating the predicted turn position with a probable turn position on a navigable route represented in a map database; and calculating the first positional error as a distance between the predicted and probable turn positions.

19. The method as recited in claim 17, including the further steps deriving a current velocity and acceleration of the MR using the corrected position value and at least one of the position values of the MR at time intervals $T_1$ through $T_{m-1}$;

validating the corrected position value using a comparison between the current velocity and acceleration of the MR and a vehicle dynamics rule base including valid ranges for a velocity and an acceleration of the MR; and supplying an averaged corrected position value to the predictive filter instead of the corrected position value when the corrected position value determined invalid by the validating step.

20. The method as recited in claim 16, wherein steps (a) through (f) are repeated for each subsequent time interval.

21. The method of claim 16, wherein said steps (a) through (f) are executed without applying a dead reckoning algorithm that uses an external sensor other than a GPS receiver.

22. The method as recited in claim 16, further including the steps of receiving the positional signal and deriving a position value of the MR at a time interval $T_{m+1}$ using the positional signal;

correcting the position value at time interval $T_{m+1}$ with the first positional error to derive a corrected position value at time $T_{1+1}$;

deriving a second positional error indicative of a high frequency noise component reducing the accuracy of the position value at time interval $T_{m+1}$, the second positional error value being determined using the corrected position value at time $T_{m+1}$ and the predicted position value at $T_m$;

applying the second positional error to the predictive filter at time interval $T_{m+1}$ as a positional variance error to drive a gain of the predictive filter; and predictively filtering the corrected position value at time interval $T_{m+1}$ with the predictive filter to derive a predicted position value of the MR at time interval $T_{m+1}$, the predicted position at time interval $T_{m+1}$ being substantially free of the low and high frequency noise components.

23. The method as recited in claim 22, wherein said step of deriving a second positional error includes the step of calculating a distance between the corrected position value at time $T_{m+1}$ and a probable navigable route represented in a map database on which the MR is probably located.

24. The method as recited in claim 23, further including the steps of identifying candidate navigable routes in the map database within a predetermined distance of the predicted position value at time interval $T_m$; and deriving a weighted distance between each of the candidate navigable routes and the predicted position value at time interval $T_m$ using a shortest distance and a difference in direction between each of the candidate navigable routes and the MR, the probable position coinciding with a position on one of the candidate navigable routes associated with a minimum weighted distance.

25. The method as recited in claim 24, wherein the high frequency noise component includes noise having a frequency of at least 1/T.

26. The method as recited in claim 25, wherein the duration of each time interval is in the approximate range of 0.5 to 2 seconds.

27. The method as recited in claim 26, wherein the low frequency noise component is caused by at least one of selective availability and multipath reflections.

28. A method of accurately determining the position of a mobile receiver (MR) based upon a received positional signal having relatively low and high frequency components corrupting the positional accuracy of the received signal, comprising:

receiving the positional signal and deriving position values of the MR using the positional signal;

applying the position values to a predictive filter to derive predicted position values of the MR;

detecting a turn of the MR using the predicted position values and deriving a first positional offset associated with the turn and representative of the low frequency noise component;

correcting position values with the first positional offset to derive corrected position values after detecting the turn;

deriving a second positional offset between each of the corrected position values and a navigable route coinciding with where the MR is probably located for each of the corrected position values, the second positional offset being representative of the high frequency noise; and applying each of the corrected position values along with the second positional offset associated with each of the corrected position values to the predictive filter to derive predicted position values substantially free of the low frequency and high frequency noise.

29. An article, comprising:
at least one sequence of machine executable instructions;
a medium bearing the executable instructions in machine readable form,
wherein execution of the instructions by one or more processors causes the one or more processors to:
seed a predictive filter with an initial value indicative of an erroneous current position value of a mobile receiver (MR) displaced a predetermined minimum distance from a known approximate position of the MR to establish an initial gain of the predictive filter;
receive a positional signal over m time periods and derive position values of the MR over the m time periods using the received signal;
derive predicted position values of the MR over the m time periods by predictively filtering the position values with the predictive filter; and
determine a probable position of the MR at an end of the m time periods using a current predicted position value, the probable position coinciding with a navigable route of where the MR is probably positioned at the end of the m time periods.

30. An article, comprising:
at least one sequence of machine executable instructions;
a medium bearing the executable instructions in machine readable form,
wherein execution of the instructions by one or more processors causes the one or more processors to:
(a) detect a turn of a mobile receiver (MR) using a received positional signal having a positional accuracy corrupted by relatively low and high frequency noise components, and derive a first positional offset associated with the turn and representative of the low frequency noise component;
(b) derive a position value of the MR using the received positional signal after detecting the turn, and correct the position value with the first positional offset associated with the turn to derive a corrected position value; and
(c) apply the corrected position value to a filter along with a second positional offset associated with the corrected position value and representative of the high frequency noise component to derive a filtered position value substantially free of the low and high frequency noise components.

31. A computer architecture, comprising:
seeding means for seeding a predictive filter with an initial value indicative of an erroneous current position value of a mobile receiver (MR) displaced a predetermined minimum distance from a known approximate position of the MR to establish an initial gain of the predictive filter;
receiving means for receiving a positional signal over m time periods and for deriving position values of the MR over the m time periods using the received signal;
deriving means for deriving predicted position values of the MR over the m time periods by predictively filtering the position values with the predictive filter; and
determining means for determining a probable position of the MR at an end of the m time periods using a current predicted position value, the probable position coinciding with a navigable route of where the MR is probably positioned at the end of the m time periods.

32. A computer architecture, comprising:
(a) detecting means for detecting a turn of a mobile receiver (MR) using a received positional signal having a positional accuracy corrupted by relatively low and high frequency noise components, and for deriving a first positional offset associated with the turn and representative of the low frequency noise component;

(b) deriving means for deriving a position value of the MR using the received positional signal after detecting the turn, and correcting means for correcting the position value with the first positional offset associated with the turn to derive a corrected position value; and (c) applying means for applying the corrected position value to a filter along with a second positional offset associated with the corrected position value and representative of the high frequency noise component to derive a filtered position value substantially free of the low and high frequency noise components.

33. A computer system, comprising:

a processor; and a memory coupled to the processor, the memory having stored therein sequences of instructions, which, when executed by the processor, cause the processor to perform the steps of:

seeding a predictive filter with an initial value indicative of an erroneous current position value of a mobile receiver (MR) displaced a predetermined minimum distance from a known approximate position of the MR to establish an initial gain of the predictive filter;

receiving a positional signal over m time periods and deriving position values of the MR over the m time periods using the received signal;

deriving predicted position values of the MR over the m time periods by predictively filtering the position values with the predictive filter; and determining a probable position of the MR at an end of the m time periods using a current predicted position value, the probable position coinciding with a navigable route of where the MR is probably positioned at the end of the m time periods.

34. A computer system, comprising:

a processor; and a memory coupled to the processor, the memory having stored therein sequences of instructions, which, when executed by the processor, cause the processor to perform the steps of:

(a) detecting a turn of a mobile receiver (MR) using a received positional signal having a positional accuracy corrupted by relatively low and high frequency noise components, and deriving a first positional offset associated with the turn and representative of the low frequency noise component;

(b) deriving a position value of the MR using the received positional signal after detecting the turn, and correcting the position value with the first positional offset associated with the turn to derive a corrected position value; and (c) applying the corrected position value to a filter along with a second positional offset associated with the corrected position value and representative of the high frequency noise component to derive a filtered position value substantially free of the low and high frequency noise components.

* * * * *